(12) United States Patent
Bahmani et al.

(10) Patent No.: US 12,726,637 B1
(45) Date of Patent: Sep. 1, 2026

(54) 3D CAMERA CONTROL IN VIDEO DIFFUSION TRANSFORMERS

(71) Applicant: Snap Inc., Santa Monica, CA (US)

(72) Inventors: Sherwin Bahmani, Toronto (CA); Willi Menapace, Los Angeles, CA (US); Guocheng Qian, Mountain View, CA (US); Aliaksandr Siarohin, Santa Monica, CA (US); Ivan Skorokhodov, Santa Monica, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/200,269

(22) Filed: May 6, 2025

(51) Int. Cl.
*H04N 19/176* (2014.01)
*G06T 5/70* (2024.01)
*G06V 20/40* (2022.01)
*H04N 19/18* (2014.01)

(52) U.S. Cl.
CPC ............. *H04N 19/176* (2014.11); *G06T 5/70* (2024.01); *G06V 20/46* (2022.01); *H04N 19/18* (2014.11)

(58) Field of Classification Search
CPC ...... H04N 19/176; H04N 19/18; G06V 20/46; G06T 5/70
USPC ..................................................... 375/240.12
See application file for complete search history.

(56) References Cited

PUBLICATIONS

Bahmani, Sherwin, "AC3D: Analyzing And Improving 3D Camera Control In Video Diffusion Transformers", Computer Vision Foundation, (Mar. 2025), 21 pgs.
Bahmani, Sherwin, "VD3D: Taming Large Video Diffusion Transformers For 3D Camera Control", Cornell University Computer Science Computer Vision And Pattern Recognition, (Mar. 2025), 26 pgs.
He, Hao, "CameraCTRL: Enabling Camera Control For Video Diffusion Models", ICLR Conference, (Mar. 2025), 32 pgs.
Wang, Zhouxia, "MotionCtrl: A Unified And Flexible Motion Controller For Video Generation", SIGGRAPH: International Conference On Computer Graphics And Interactive Techniques, (Jul. 2024), 22 pgs.

*Primary Examiner* — Nguyen T Truong
(74) *Attorney, Agent, or Firm* — Schwegman Lundberg & Woessner, P.A.

(57) ABSTRACT

Examples relate to systems and methods for generating videos with precise camera control using a camera-conditioned video diffusion transformer (DiT) model. The model performs a denoising process through a series of pretrained video DiT blocks, where camera trajectory information is processed through a camera conditioning branch to generate camera activations. During an initial portion of denoising passes, the process is conditioned on camera activations for an initial subset of video DiT blocks, while later denoising passes proceed without camera conditioning. This approach leverages the insight that camera motion is established early in the denoising process, enabling precise camera control while maintaining high visual quality.

20 Claims, 19 Drawing Sheets

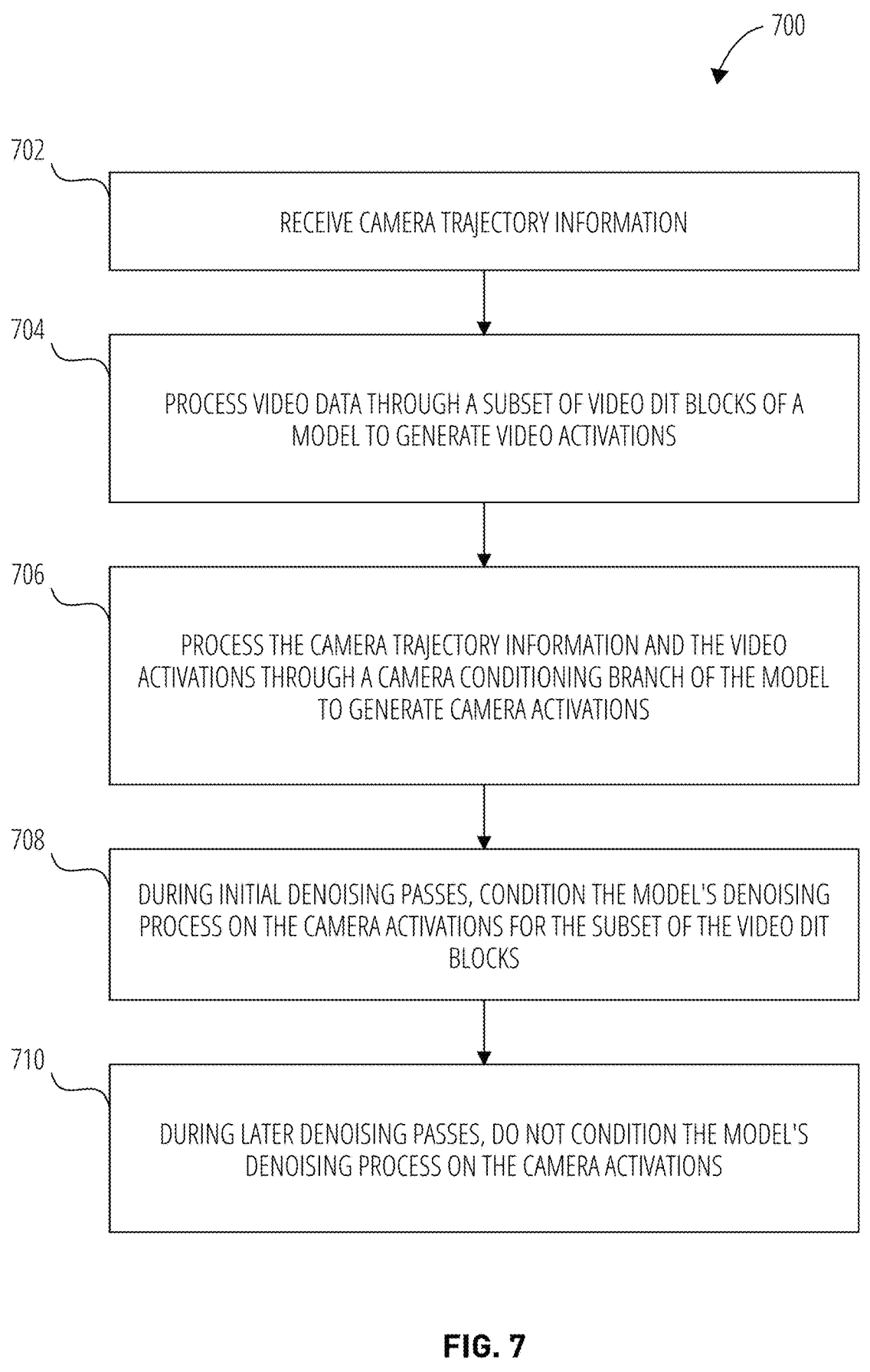

700

702 RECEIVE CAMERA TRAJECTORY INFORMATION

704 PROCESS VIDEO DATA THROUGH A SUBSET OF VIDEO DIT BLOCKS OF A MODEL TO GENERATE VIDEO ACTIVATIONS

706 PROCESS THE CAMERA TRAJECTORY INFORMATION AND THE VIDEO ACTIVATIONS THROUGH A CAMERA CONDITIONING BRANCH OF THE MODEL TO GENERATE CAMERA ACTIVATIONS

708 DURING INITIAL DENOISING PASSES, CONDITION THE MODEL'S DENOISING PROCESS ON THE CAMERA ACTIVATIONS FOR THE SUBSET OF THE VIDEO DIT BLOCKS

710 DURING LATER DENOISING PASSES, DO NOT CONDITION THE MODEL'S DENOISING PROCESS ON THE CAMERA ACTIVATIONS

FIG. 7

3D CAMERA CONTROL IN VIDEO DIFFUSION TRANSFORMERS

TECHNICAL FIELD

The present disclosures relate to artificial intelligence video generation systems and, in some examples, to algorithms and systems to enable precise 3D camera control in video diffusion transformer models while maintaining high visual quality.

BACKGROUND

Artificial Intelligence (AI) has made significant strides in recent years, particularly in the domains of computer vision and natural language processing. Machine learning techniques, such as deep learning and neural networks, have enabled AI systems to process and generate complex visual and textual data with increasing sophistication. In the realm of video generation, diffusion models can be used to create high-quality, diverse content from text or image inputs. These models work by gradually denoising random noise to produce coherent video frames, guided by the input prompt. Transformer architectures, originally developed for natural language tasks, have been adapted for video and audio generation, potentially offering improved quality, scalability, and/or training efficiency.

Extended Reality (XR) technologies, encompassing Virtual Reality (VR), Augmented Reality (AR), and Mixed Reality (MR), provide immersive and interactive experiences. These technologies rely on 3D rendering techniques to create convincing virtual environments or overlay virtual content onto the real world. The development of lightweight, high-resolution displays and advanced motion tracking systems has the potential to further improve user experience in XR applications.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. Some non-limiting examples are illustrated in the figures of the accompanying drawings in which:

FIG. 7 is a flowchart illustrating a method for generating a camera-conditioned video, according to some examples.

DETAILED DESCRIPTION

Figure 1A:
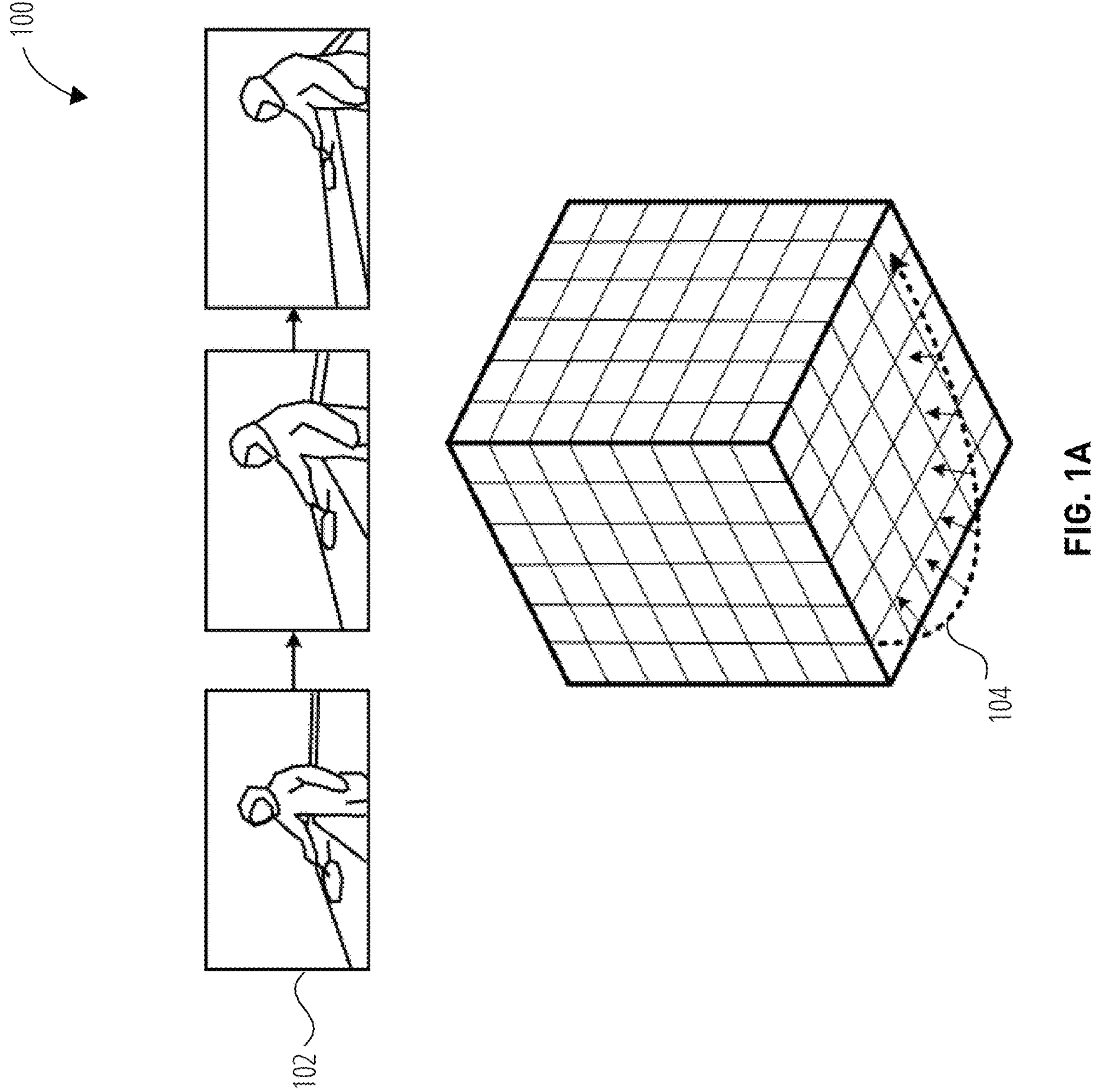
FIG. 1A is a diagram illustrating camera-controlled video generation with a first camera trajectory arcing to the right, according to some examples.

Examples described herein attempt to address the challenge of precise 3D camera control in video generation systems using artificial intelligence. Current text-to-video generation models can create realistic videos from text descriptions but lack fine-grained control over camera movements. When users attempt to specify camera movements through text prompts (such as "show a video where the camera circles around a person"), these models often fail to follow the instructions accurately, resulting in unpredictable camera behavior.

The described examples provide a solution through a camera-conditioned video diffusion transformer (DiT) model that enables precise control over camera movement while maintaining high visual quality. This technology allows users to generate videos with specific camera trajectories, such as panning, zooming, or rotating around subjects.

In some examples, a video diffusion transformer (VDiT) model is provided that performs a denoising process to generate videos. A video diffusion model denoises video data through an iterative process that starts with random noise and progressively refines the noise into a coherent video by applying a series of transformer blocks that gradually remove noise across multiple denoising passes by resolving the noise into recognizable visual features of a temporal sequence of frames, with early passes establishing low-frequency visual signals like camera motion and later passes developing high-frequency visual details. The examples introduce a specialized camera conditioning branch that works alongside the main video generation process to ensure the resulting video follows the desired camera trajectory.

Experimental testing has established the insight that camera motion in videos is primarily a low-frequency signal that is determined early in the video generation process. Through analysis of motion spectral volumes, it was discovered that camera movements are established in an initial portion of the denoising process, such as approximately the first 10% of denoising passes. In some examples, this finding informs an optimized approach wherein camera conditioning is applied only during early denoising passes, potentially improving both visual quality and camera control accuracy. Different examples may therefore apply camera conditioning to only the first 20%, first 40%, or some other early portion of denoising passes or iterations.

Another important discovery is that in pre-trained video transformer models, camera information is primarily processed in the early layers of the model (such as the first 8 out of 32 layers). By limiting camera conditioning to only these early layers, some examples can achieve more efficient processing while preventing interference with other visual features that are developed in later layers of the model.

In some examples, the camera-conditioned video DiT model includes several components working together. A text preprocessor handles text input prompts, while a video preprocessor processes any video input. Camera trajectory information is fed into a camera conditioning branch with a camera preprocessor that transforms the spatial data into a format compatible with the video diffusion model, and a series of diffusion transformer blocks for camera data (C-DiT blocks) for interoperating with the video transformer model to cross-condition the video generation process on the camera trajectory information. The video diffusion model itself consists of a series of transformer blocks (V-DiT blocks) that progressively refine the video over each of an iterative sequence of denoising passes. A video postprocessor then converts the final output into the generated video.

In some examples, the camera preprocessor of the camera conditioning branch includes further specialized components, such as a transformation block that converts camera trajectory information into a spatial representation, a temporal encoding block to match the temporal characteristics of the video data, and a patchify block that projects the spatial-temporal representation to match the dimensions of the video tokens processed by the video diffusion model.

During operation, the camera-conditioned video DiT model processes video data through an initial subset of video DiT blocks (such as the first 25% of video DiT blocks) to generate video activations. The model processes the camera trajectory information and these video activations through the camera conditioning branch to generate camera activations. For the initial denoising passes, the system conditions the denoising process on these camera activations, but for later passes, it proceeds without camera conditioning.

Configuring and training the model leverages the use of an existing pretrained video DiT model to serve as the video processing branch of the model as a whole. In some examples, the model is trained on a dataset that includes two types of video training data: videos with static cameras showing action in a scene, and videos with moving cameras and static scenes. This balanced training dataset helps the model distinguish between camera movement and scene movement. During training, the weights or learnable parameters of the video DiT blocks remain frozen, while the weights or learnable parameters of other blocks are adjusted: for example, the weights of the camera DiT blocks and camera encoding block of the camera conditioning branch are adjusted. In some examples, the model also includes various other components including learnable parameters that are adjusted during training, such as fully-connected layers mediating between other components of the camera conditioning branch and/or camera preprocessor.

Some examples may provide improved AI-generated video technology, enabling users such as creative professionals, filmmakers, and content creators to achieve precise camera movements without specialized equipment, by allowing users to specify exactly how the camera should move throughout a scene.

In some examples, the generation of video content aligned with specified camera trajectories can be leveraged in the context of extended reality (XR) or other video-based applications of head-mounted displays. Examples of XR displays and other devices are described herein as examples of platforms suitable for training or execution of models described herein, and/or for the deployment of video content created thereby.

FIG. 1A is a schematic diagram illustrating a first example of video generation 100 with camera trajectory control. A generated video 102, showing an astronaut cooking on a stove, is generated based on a camera trajectory 104. The generated video 102 is represented as a sequence of video frames, showing the temporal progression of the video from left to right. The camera trajectory 104 is represented within a three-dimensional grid pattern, illustrating the 3D spatial path that the camera follows during video generation. The direction the camera is pointing throughout the trajectory is shown by the short arrows extending from different points along the trajectory.

The camera trajectory 104 in this figure depicts a camera path arcing to the right on a constant horizontal plane, as indicated by the dotted line. This trajectory information serves as an input to a video generation system, allowing precise control over how the virtual camera or viewpoint of the video moves through the scene while the video is being generated.

The generated video 102 shows a consistent scene with subjects that remain in frame while the viewpoint of the camera changes according to the specified camera trajectory 104. The video frames in the generated video 102 progress sequentially, with each frame representing a different position along the camera trajectory 104.

Figure 1B:
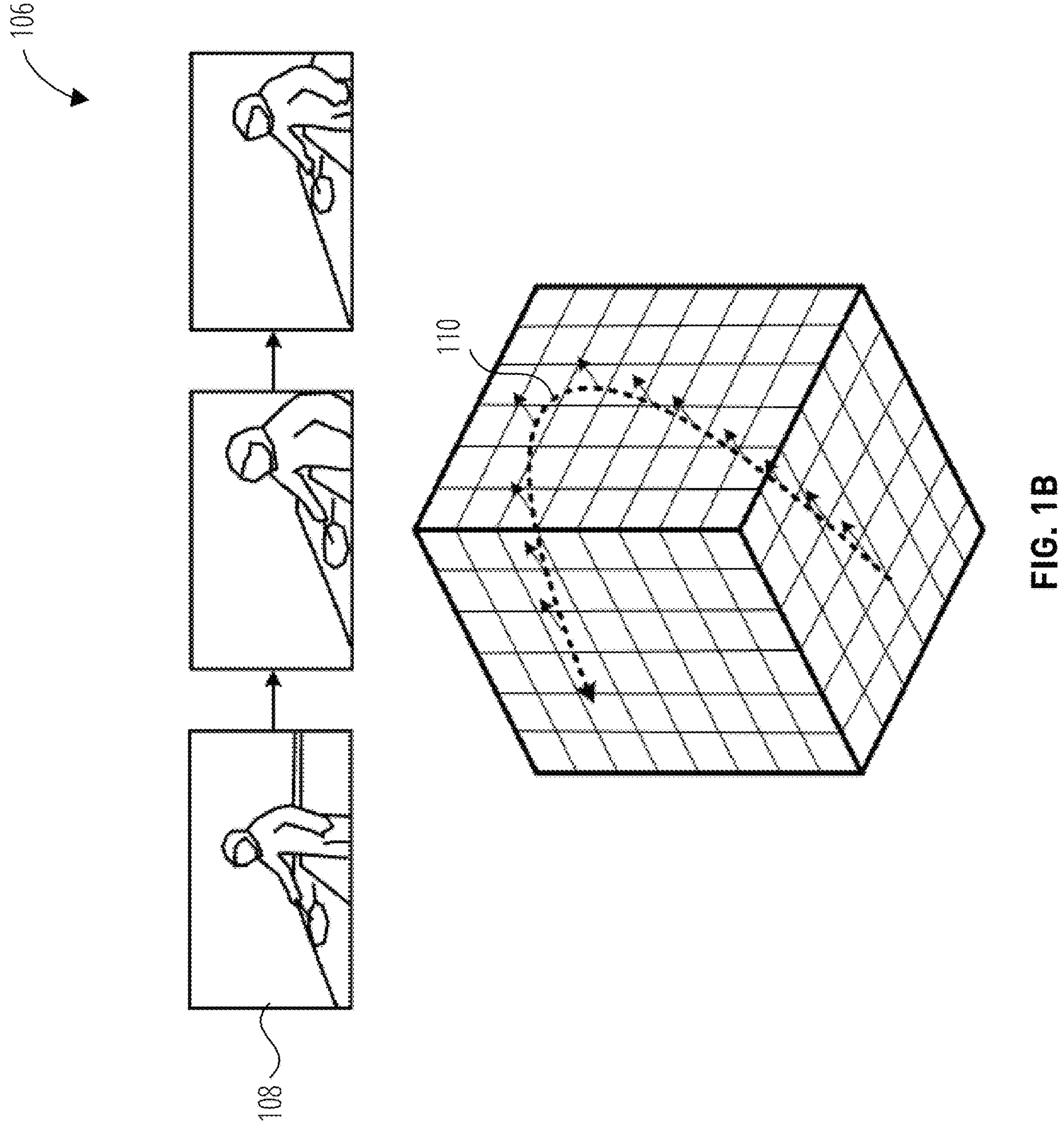
FIG. 1B is a diagram illustrating camera-controlled video generation with a second camera trajectory zooming in and out along an upward arc, according to some examples.

FIG. 1B is a schematic diagram illustrating video generation 106 using a second example camera trajectory 110. Unlike the horizontal camera arc shown in FIG. 1A, the camera trajectory 110 in this figure depicts a camera trajectory that zooms in and out along an upward arc, as indicated by the dotted line on the three-dimensional grid.

The generated video 108 shows the same scene content (an astronaut cooking on a stove) as in FIG. 1A, but with a different camera perspective progression due to the different trajectory input. This demonstrates how the same underlying scene can be visualized from various viewpoints based solely on changes to the camera trajectory information. The direction the camera is pointing throughout the trajectory is shown by the short arrows extending from different points along the trajectory.

This comparison between FIG. 1A and FIG. 1B illustrates the system's ability to synthesize the same scene with different camera trajectories as input.

Figure 2:
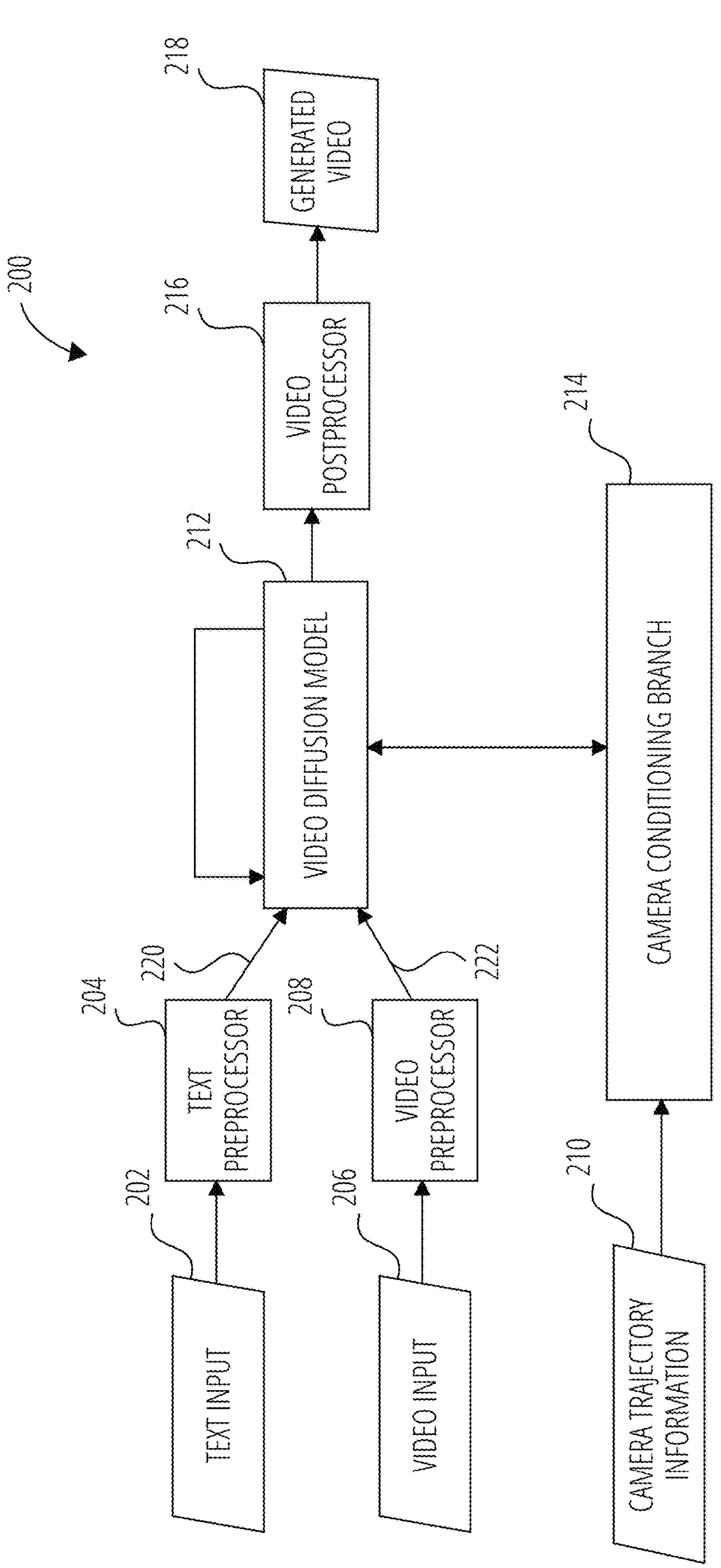
FIG. 2 is a block diagram illustrating a video diffusion transformer model with camera conditioning, according to some examples.

FIG. 2 is a block diagram illustrating a video diffusion transformer model with camera conditioning, shown as VDiT-CC model 200. The VDiT-CC model 200 includes several interconnected components that work together to generate videos with camera trajectory control.

In some examples, VDiT-CC model 200 receives one or more of three inputs: a text input 202, a video input 206, and camera trajectory information 210. The text input 202 is processed by a text preprocessor 204, which encodes the text into a format suitable for conditioning the operation of a video diffusion model 212. The video input 206 is similarly processed by a video preprocessor 208, which converts the video into a video encoding 222 that can be used by the video diffusion model 212.

The camera trajectory information 210 is fed into a camera conditioning branch 214, which processes the spatial data and transforms it into a format compatible with the video diffusion model 212. The camera trajectory information 210 may include camera extrinsics (e.g., represented as 4×4 matrices that encode the camera's position and orientation in 3D space) and camera intrinsics (e.g., represented as 3×3 matrices that encode the internal parameters of the camera lens).

In some examples, the camera extrinsics are represented as 4×4 matrices ($C_f \in R4\times4$) that encode the camera's position and orientation in 3D space, consisting of a 3×3 rotation matrix combined with a translation vector that forms the last column, fully describing the camera's position and orientation for each frame f in the video sequence.

In some examples, the camera intrinsics are represented as 3×3 matrices ($K_f \in R3\times3$) that encode the internal parameters of the camera lens, including focal length, principal point offset, and field of view parameters, which determine how the 3D scene is projected onto the 2D image plane.

The video diffusion model 212 serves as the core video processing component of the VDiT-CC model 200, processing inputs from the text preprocessor 204, video preprocessor 208, and camera conditioning branch 214. The video diffusion model 212 performs a denoising process through multiple passes to generate a coherent video that follows the specified camera trajectory. As described in greater detail below with reference to FIG. 3 and FIG. 4, the video diffusion model 212 can be implemented as a series of video DiT blocks from a pretrained video transformer model. The video diffusion model 212 provides a video processing branch or pathway within the VDiT-CC model 200.

After one or more denoising passes are performed on the video data by the video diffusion model 212, the denoised video data output is sent to a video postprocessor 216, which converts the processed data into a generated video 218. The video postprocessor 216 may decode the latent representations back into pixel space to produce the final video output.

The text encoding 220 from the text preprocessor 204 and/or the video encoding 222 from the video preprocessor 208 can be fed into the video diffusion model 212, allowing the model to generate content based on textual descriptions and/or visual inputs. The camera conditioning branch 214 provides additional control over the camera movement in the generated video. Details of the camera conditioning branch 214 are provided below with reference to FIG. 5, whereas details of the text preprocessor 204 and video preprocessor 208 are provided below with reference to FIG. 6.

The operation of the VDiT-CC model 200 during inference to generate camera-conditioned video is described below with reference to example method 700 of FIG. 7. An example training method 800 for the VDiT-CC model 200 is described below with reference to FIG. 8.

The architecture shown in FIG. 2 can enable precise camera controllability in pre-trained video diffusion transformers, allowing joint conditioning of text and camera sequences to generate videos with specific camera movements while maintaining high visual quality.

Figure 3:
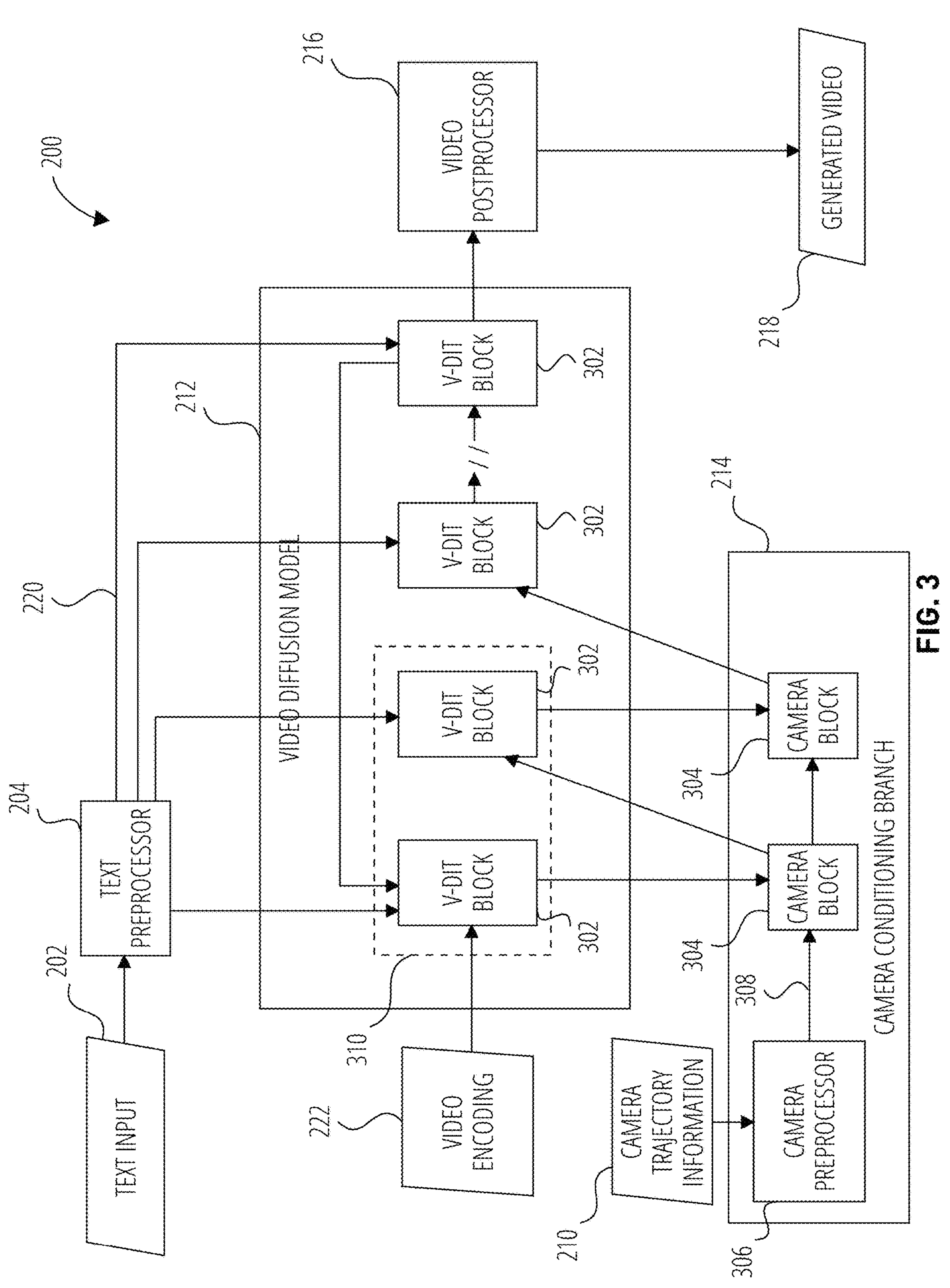
FIG. 3 is a block diagram illustrating a detailed implementation of the video diffusion model of FIG. 2 with a camera conditioning branch operating during an initial subset of de-noising passes, according to some examples.

FIG. 3 is a block diagram illustrating a detailed implementation of the VDiT-CC model 200 with a camera conditioning branch 214, characterizing operation of the VDiT-CC model 200 during an initial subset of de-noising passes. This configuration of data processing and video generation characterizes the operation of the VDiT-CC model 200 when the video denoising process is being conditioned on the camera trajectory information 210. In some examples, this conditioning is applied only during a subset of the denoising passes performed by the video diffusion model 212, such as an initial subset or portion of the denoising passes (e.g., the first 40% or first 20% of denoising passes, such as the first 16 or 8 passes out of a 40-pass video generation process).

The video diffusion model 212 is shown with multiple V-DiT blocks 302 arranged in series. The V-DiT blocks 302 process video data and are interconnected to each other and/or through the camera conditioning branch 214 to form a processing pipeline. A text input 202 is processed by the text preprocessor 204, which feeds the text encoding 220 into each V-DiT block 302 of the video diffusion model 212 as a conditioning input. In some examples, the video diffusion model 212 also receives the video encoding 222 as input to the first V-DiT block 302 of the series.

In some examples, the V-DiT blocks 302 can be obtained by using the unmodified DiT blocks of an existing, pre-trained video DiT model, such as an existing commercially or publicly available pretrained video DiT model. The order of the DiT blocks in the original pretrained model is preserved. Because DiT models have a uniform structure repeated over a series of DiT blocks, the DiT blocks can be repurposed for use by the VDiT-CC model 200 without modifying their internal structure or the values of their learned parameters or weights.

In some examples, each V-DiT block 302 includes a set of sub-components used in video DiT models. In one example, the V-DiT block 302 includes a cross-attention layer to read the text encoding 220 (e.g., produced by a T5 model of the text preprocessor 204); a self-attention layer; and a fully-connected network with a 4× dimensionality expansion. Each attention layer has 32 heads and a root-means-squared layer normalization (RMSNorm) block for queries and keys normalization.

The video diffusion model 212 is structured such that the series of V-DiT blocks 302 includes an initial portion 310 of the series (shown as only two V-DiT blocks 302 for simplicity) and one or more remaining V-DiT blocks 302 positioned after the initial portion 310 in the series (the "//" in FIG. 3 elides any number of additional V-DiT blocks 302 in the series). In the camera conditioning configuration shown in FIG. 3, the V-DiT blocks 302 of the initial portion 310 process their data inputs to generate video activations, which are fed to corresponding camera blocks 304 in the camera conditioning branch 214. The remaining V-DiT blocks 302 positioned later in the series provide their video activations as input to the subsequent V-DiT block 302 in the series, until the final V-DiT block 302 is reached, which provides its video activations back to the first V-DiT block 302 of the model (for a further denoising pass) and/or to the video postprocessor 216 for decoding or otherwise postprocessing to generate the generated video 218 (after the final denoising pass).

The camera conditioning branch 214 receives the camera trajectory information 210 (e.g., camera extrinsics and intrinsics). The camera trajectory information 210 is processed by a camera preprocessor 306, which generates a camera encoding 308 suitable for interoperation and combination with the video data being processed by the video diffusion model 212. The camera encoding 308 is then fed into a series of camera blocks 304 within the camera conditioning branch 214. In the illustrated example, each camera block 304 corresponds to one of the V-DiT blocks 302 of the initial portion 310 of the series of V-DiT blocks 302 of the video diffusion model 212. The camera block 304 receives two inputs: either the camera encoding 308 (from the camera preprocessor 306) or the camera activations generated by the previous camera block 304 in the series; and the video activations of the corresponding V-DiT block 302. These inputs are processed by the camera block 304 to generate its camera activations as output.

Thus, each camera block 304 in the camera conditioning branch 214 corresponds to and interacts with a V-DiT block 302 in the initial portion 310 of the video diffusion model 212. This interaction is represented by connections from the corresponding V-DiT block 302 to the camera block 304, and from the camera block 304 to the subsequent V-DiT block 302. The camera blocks 304 provide camera activations that condition the denoising process performed by the V-DiT blocks 302.

The example architecture of the VDiT-CC model 200 shown in FIG. 3 may enable precise camera control in video generation by conditioning the initial portion of the denoising process (e.g., the first 10%, 20%, 40%, or other early portion) on camera trajectory information, while allowing later stages of the process to proceed without camera conditioning, resulting in improved visual quality and camera movement accuracy.

Figure 4:
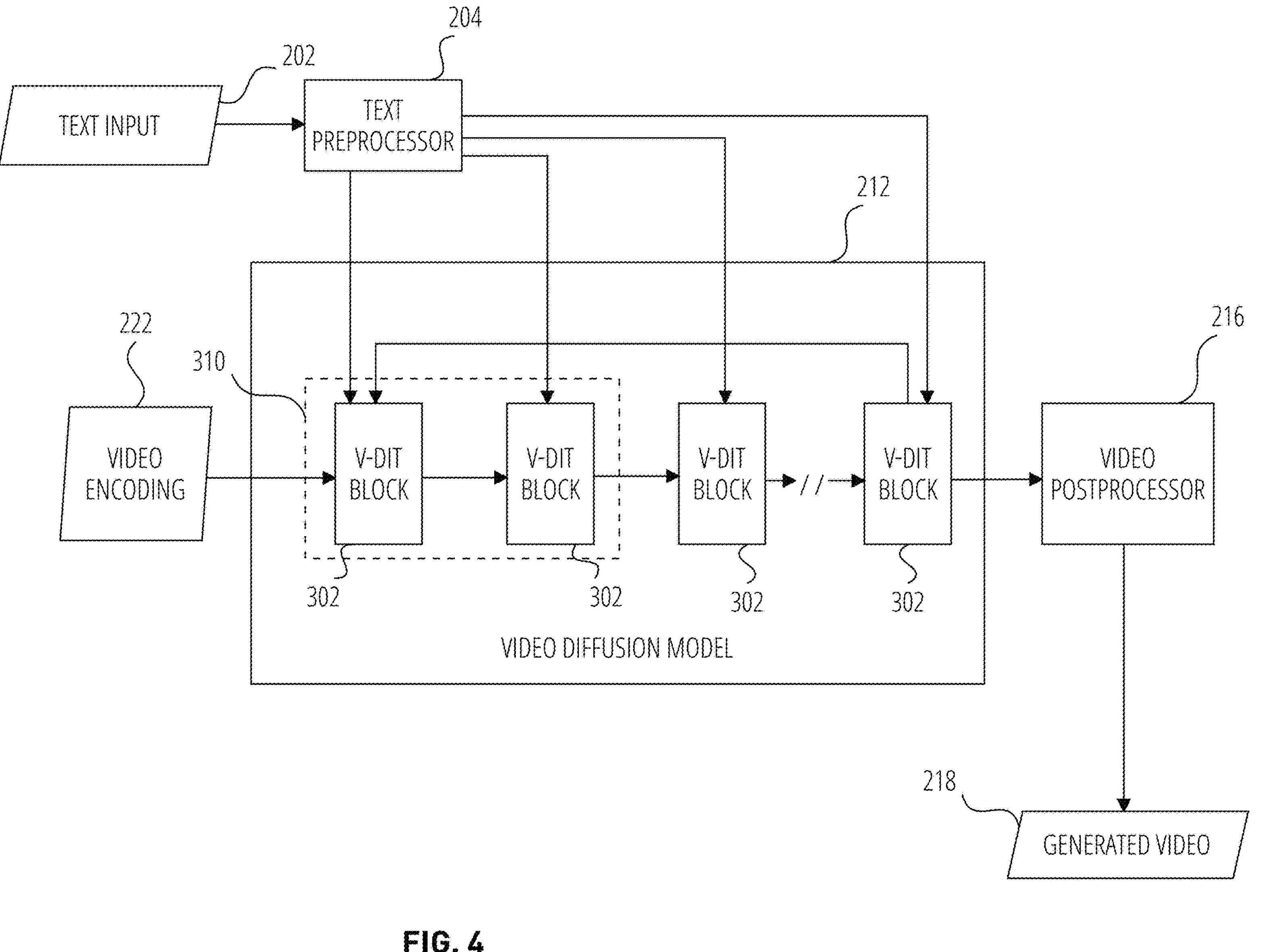
FIG. 4 is a block diagram illustrating an implementation of the video diffusion model of FIG. 2 without the camera conditioning branch operating during a later subset of de-noising passes, according to some examples.

FIG. 4 is a block diagram illustrating an implementation of the VDiT-CC model 200 without the camera conditioning branch 214, characterizing operation of the VDiT-CC model 200 during later denoising passes.

Unlike FIG. 3, this diagram shows the video diffusion model 212 operating without the camera conditioning branch 214 during later denoising passes, after the initial subset or portion (e.g., 10%, 20%, or 40%) of denoising passes have been performed using the configuration of FIG. 3. The key difference is the absence of the camera conditioning branch 214 that was present in FIG. 3, and the input/output configuration of the V-DiT blocks 302 in the initial portion 310 of the series.

The video diffusion model 212 still contains the same series of V-DiT blocks 302, including those that were previously in the initial portion 310. However, in this configuration, the V-DiT blocks 302 process video data (from the video preprocessor 208) and/or video activations (from a previous V-DiT block 302 in the series) directly without receiving camera activations from camera blocks.

The text input 202 is still processed by the text preprocessor 204, and the video encoding 222 is still provided as input to the first V-DiT block 302. The output from the final V-DiT block 302 continues to be sent to the video postprocessor 216, which generates the final generated video 218.

In some examples, the configuration of the VDiT-CC model 200 shown in FIG. 4 is used during the later subset of the denoising passes (e.g., approximately 80% of the passes), after the camera motion has been established in the initial subset (e.g., 20%) of passes. This approach may improve visual quality by allowing the unmodified pre-trained video transformer (e.g., video diffusion model 212) to focus on generating high-frequency details without being constrained or perturbed by camera conditioning.

Figure 5:
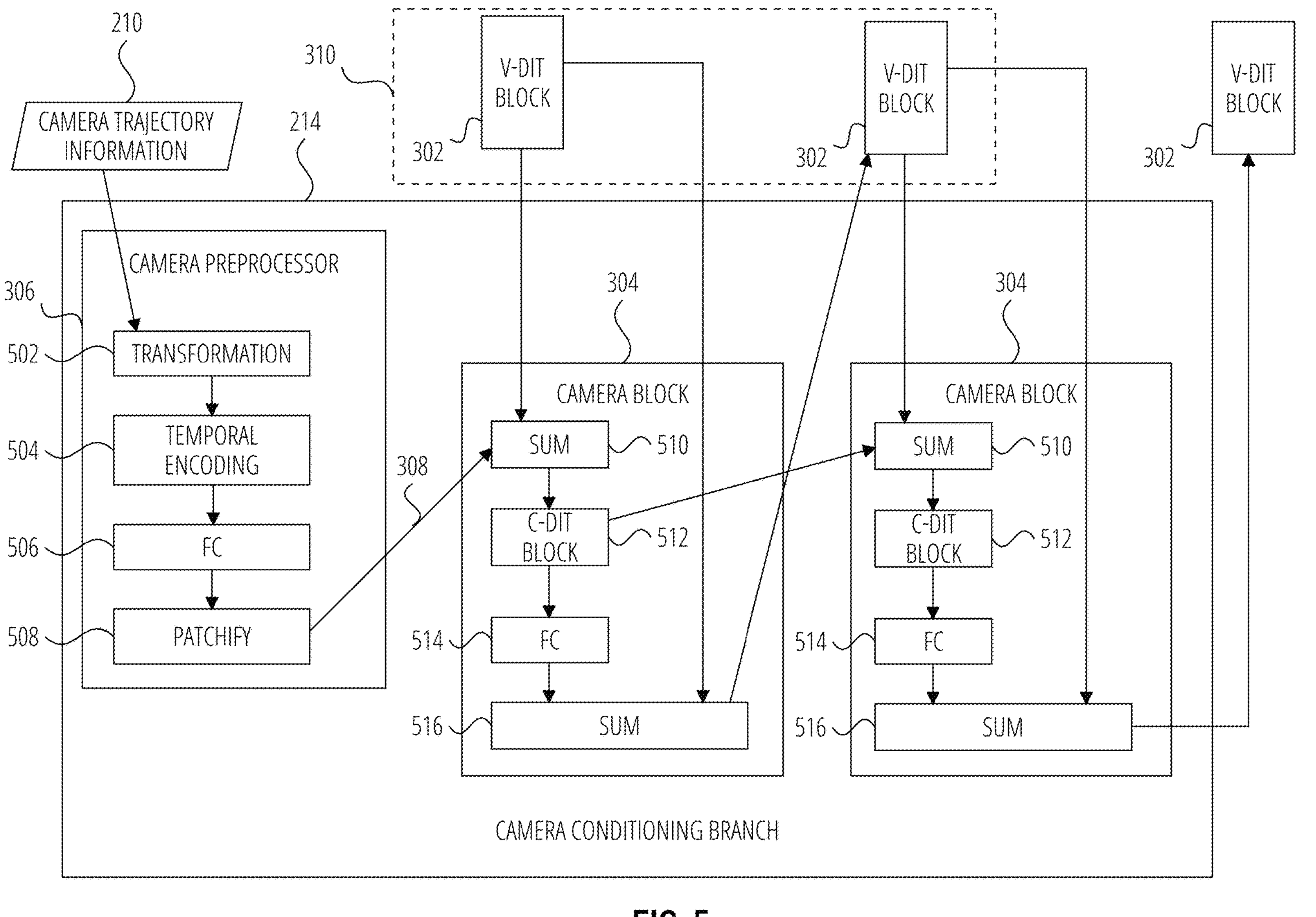
FIG. 5 is a block diagram illustrating the detailed structure of the camera conditioning branch of FIG. 3, according to some examples.

FIG. 5 is a block diagram illustrating the detailed structure of the camera conditioning branch 214 of the VDiT-CC model 200 of FIG. 3.

As described above, the camera conditioning branch 214 receives camera trajectory information 210 and processes it through a camera preprocessor 306. The camera preprocessor 306 includes several specialized components that transform the camera trajectory information 210 into a format compatible with the camera blocks 304 and the V-DiT block 302.

In the illustrated example, the camera preprocessor 306 includes a transformation block 502, a temporal encoding block 504, a fully connected layer 506, and a patchify block 508. The transformation block 502 receives the camera trajectory information 210, which may include camera extrinsics (e.g., 4×4 matrices) and intrinsics (e.g., 3×3 matrices) as described above, and transforms this data into a spatial representation, such as Plücker coordinates for each pixel. Plücker coordinates provide a dense representation of camera parameters for each pixel in a given frame of a video. The use of Plücker coordinates has been found in experimental testing to potentially improve the performance of transformer models in maintaining accurate camera control throughout the video generation process.

The temporal encoding block 504 encodes the spatial representation (e.g., the Plücker coordinates encoding the camera trajectory over time) to match the temporal characteristics of the video data (e.g., a predetermined video frame rate). This process generates a spatial-temporal representation (e.g., a distinct spatial encoding for each time step corresponding to a video frame of the generated video 218, based on the predetermined video frame rate). In some examples, the video autoencoder of the video preprocessor 208 (described below with reference to FIG. 6) compresses the temporal dimension by a predetermined factor (e.g., the frame rate of the video input 206 is compressed by a factor of 4), with the temporal encoding block 504 implementing a sequence of causal 1D convolutions that transform an Fx6 sequence of Plücker coordinates for each pixel (e.g., the output of the transformation block 502) into an (F//4)×32 spatial-temporal representation (e.g., the output of the temporal encoding block 504), where F is the number of frames of the video being generated (e.g., generated video 218).

The fully connected layer 506 processes this encoded spatial-temporal representation, and the patchify block 508 projects the spatial-temporal representation to match the dimensions of the video tokens processed by the video diffusion model, thereby generating the camera encoding 308. In some examples, the patchify block 508 segments the camera data into camera encoding tokens that correspond to regions of each video frame.

Thus, in some examples, the camera preprocessor 306 includes a transformation block 502 to transform the camera trajectory information 210 into a spatial representation, a camera temporal encoding block 504 to encode the spatial representation to match temporal characteristics of the video data to generate a spatial-temporal representation, and a patchify block 508 to project the spatial-temporal representation to match dimensions of the video tokens, thereby generating the camera encoding 308.

The camera encoding 308 is fed into the first camera block 304 in the series. Each camera block 304 includes a sum operation 510, a C-DiT block 512, a fully connected layer 514, and another sum operation 516. The camera blocks 304 correspond to the V-DiT blocks 302 in the initial portion of the video diffusion model 212.

The first sum operation 510 combines the camera encoding 308 (for the first camera block 304), or the output from the previous camera block 304 (for each subsequent camera block 304), with the output from the corresponding V-DiT block 302. In some examples, the combination is a straightforward summation, with both data inputs having equal dimensionality due to the preprocessing performed by the video preprocessor 208 and camera preprocessor 306. This combined video and camera data is then processed by the C-DiT block 512, which is a DiT block for processing camera data. In some examples, the C-DiT blocks 512 are lightweight transformer blocks with smaller parameter counts than the V-DiT blocks 302, such as 128 hidden dimensionality and 4 attention heads. The smaller size of the C-DiT blocks 512 relative to the V-DiT blocks 302 can improve both training time and the computational intensity of inference, while still yielding accurate results due to the relative low density of camera trajectory data relative to video data.

In some examples, each C-DiT block 512 performs self-attention operations on the combined video and camera data, allowing the model to focus on relevant aspects of the camera information in relation to the video content. The mathematical operation for self-attention can be expressed as:

$$\text{Attention}(Q, K, V) = softmax\left(\frac{QK^T}{\sqrt{d}}\right)V$$

where Q, K, and V are query, key, and value matrices derived from the input, and d is the dimensionality of the key vectors.

The output from the C-DiT block 512 is then passed through the fully connected layer 514, which applies a non-linear transformation to the data. The fully connected layer operation can be represented as:

$$FC(x) = \sigma(Wx + b)$$

where x is the input data, W is a weight matrix, b is a bias vector, and σ is a non-linear activation function.

The output from the fully connected layer 514 is then combined with the original input (e.g., the video activations from the corresponding V-DiT block 302) through a second sum operation 516, implementing a residual connection that helps maintain gradient flow during training. This final output serves as the camera activations that condition the next V-DiT block 302 in the series of V-DiT blocks 302 of the video diffusion model 212.

Figure 6:
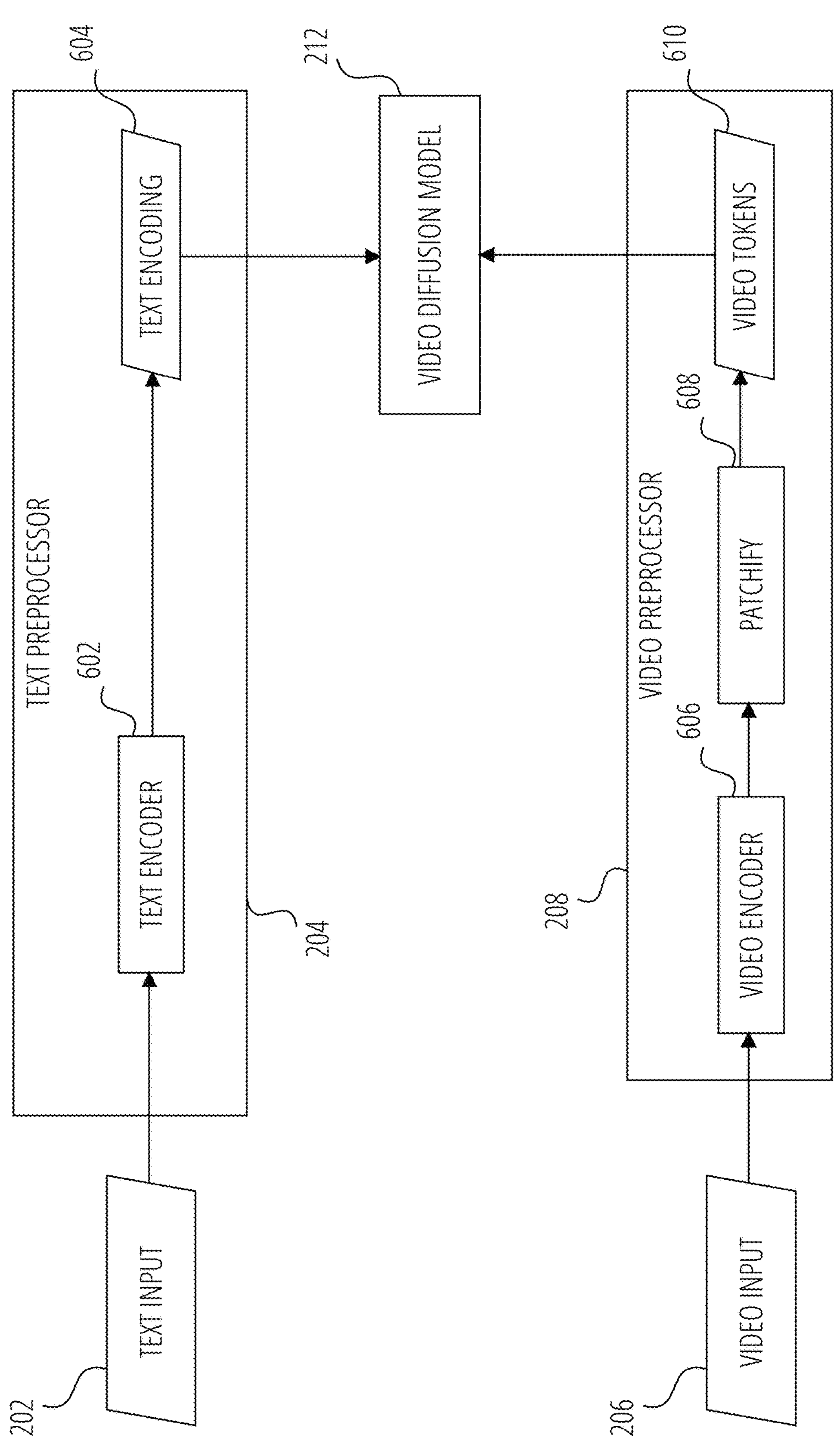
FIG. 6 is a block diagram illustrating the preprocessing components for text and video inputs to the video diffusion model of FIG. 2, according to some examples.

FIG. 6 is a block diagram illustrating the preprocessing components for text and video inputs to the video diffusion model 212.

The diagram shows two parallel preprocessing pathways: a text preprocessor 204 and a video preprocessor 208. These pathways process the text input 202 and video input 206, respectively, before they are fed into the video diffusion model 212 (e.g., according to the configurations shown in FIG. 3 and FIG. 4).

The text preprocessor 204 includes a text encoder 602 that receives the text input 202. The text encoder 602 processes the text input 202 to generate a text encoding 604, which is then provided to the video diffusion model 212. In some examples, the text encoder 602 is implemented using a T5 (Text-to-Text Transfer Transformer) encoder that produces text embeddings. The T5 encoder applies a series of transformer layers to convert the input text into a high-dimensional representation that captures semantic information. This text encoding 604 is then passed into the video diffusion model 212 via cross-attention mechanisms in each V-DiT block 302.

The video preprocessor 208 includes a video encoder 606 that receives the video input 206. The video encoder 606 processes the video input 206 to generate encoded video data. The video encoder 606 is followed by a patchify block 608 that segments the encoded video data into video tokens 610. These video tokens 610 are then provided to the video diffusion model 212.

In some examples, the video encoder 606 is implemented as an encoder portion of a variational autoencoder (VAE), such as CogVideoX, that encodes and compresses video or image input, such as the input video. In the context of the example implementation described above in reference to FIG. 3 through FIG. 5, the VAE encoder can include a causal 3D convolutional autoencoder with a 4×8×8 compression rate and 16 channels for each latent token. This compression reduces the spatial and temporal dimensions of the video, making the subsequent transformer operations more computationally efficient. In some examples, a decoder portion of the VAE can be used as a component of the video postprocessor 216 of FIG. 2 to decode the video activation from the final DiT block to generate the generated video 218.

The patchify block 608 further processes the encoded video by dividing it into patches corresponding to regions of each video frame, similar to the approach used in Vision Transformer (ViT) architectures. In some examples, a 2×2 ViT-like patchification is applied to the input latents to further reduce the sequence size. This patchification process transforms the continuous video representation into discrete tokens that can be processed by the transformer architecture of the video diffusion model 212.

The video tokens 610 output by the patchify block 608 are then fed into the video diffusion model 212, where they are processed alongside the text encoding 604 to generate the final video output.

In some examples, the video preprocessor 208 interoperates with various components of the V-DiT blocks 302 and camera blocks 304 to match or normalize the data types being combined or exchanged. For example, to encode camera positional information, a 3D rotary position embedding (RoPE) attention block can be included (e.g., within each camera block 304), wherein each axis (temporal, vertical, and horizontal) has a fixed dimensionality allocated for it in each attention head (the dimensions can be split in the ratio of 2:1:1 for temporal, vertical, and horizontal axes, respectively). A layer normalization (LayerNorm) technique can be used to normalize the activations in each V-DiT block 302. A causal 3D convolutional autoencoder can be used in the video preprocessor 208, such as a CogVideoX autoencoder with a 4×8×8 compression rate and 16 channels for each latent token. In some such examples, the hidden dimensionality of the video diffusion model 212 is 4,096, and the video diffusion model 212 has 11.5 B parameters in total. Block modulations can be used to condition the video backbone (video diffusion model 212) on the rectified flow timestep information, with a sigmoid linear unit (SiLU)

activation function used to generate video activations and 2×2 ViT-like patchification of the input latents by the patchify block 608 to reduce the sequence size.

The preprocessing architecture shown in FIG. 6 may enable the video diffusion model 212 to effectively process both text and video inputs, allowing for text-conditioned video generation and video-to-video transformation tasks. The preprocessing components reduce the dimensionality of the inputs while preserving the essential information needed for high-quality video generation.

In some examples, the video diffusion model 212 generates the video without using a video input 206—instead, random noise may effectively be used as the video input 206, and the content of the video can be dictated entirely by the text input 202 and the camera trajectory information 210. In some examples, the video diffusion model 212 does not condition the video generation process on a text input 202.

FIG. 7 is a flowchart illustrating a method 700 for generating a camera-conditioned video.

The operations of method 700 are described below with reference to the VDiT-CC model 200 described above. However, it will be appreciated that one or more of these operations can be implemented or performed by other means, or by other components of the VDiT-CC model 200 than those identified, in some cases or in different examples.

The method 700 begins with operation 702, which involves receiving camera trajectory information. In some examples, the camera trajectory information 210 corresponds to the input shown in FIG. 2 that is provided to the camera conditioning branch 214. It may include camera intrinsics and extrinsics in some examples.

Operation 704 involves processing video data through a subset of video DiT blocks of a model to generate video activations. In some examples, operation 704 corresponds to the processing performed by the initial portion 310 of V-DiT blocks 302 shown in FIG. 3, where video data (e.g., video activations combined with camera activations as described above with reference to FIG. 5) is processed through the first subset of V-DiT blocks 302. In some examples, the initial portion 310 can include the first 8 out of 32 total V-DiT blocks 302 of the video diffusion model 212, or approximately 25% of the total number of blocks in the series.

Operation 706 involves processing the camera trajectory information and the video activations through a camera conditioning branch of the model to generate camera activations. In some examples, operation 706 corresponds to the processing performed by the camera conditioning branch 214 shown in FIG. 3 and detailed in FIG. 5, where the camera trajectory information 210 is processed by the camera preprocessor 306 to generate a camera encoding 308, which is then processed through camera blocks 304 along with video activations from the corresponding V-DiT blocks 302. It will be appreciated that operation 704 and operation 706 can be performed in a repeating alternating sequence for a given data processing path, according to the data inputs and outputs shown in FIG. 3.

At operation 708, initial denoising passes are performed, during which the model's denoising process is conditioned on the camera activations for the subset of the video DiT blocks. In some examples, operation 708 corresponds to the configuration shown in FIG. 3, where the camera conditioning branch 214 provides camera activations to the initial portion 310 of V-DiT blocks 302. Based on the experimental testing and analysis of camera motion in video diffusion models, it may be advantageous for this conditioning to be applied during approximately the first 10-40% of the denoising passes (such as the first 20% or 40%), when the low-frequency camera motion information is established. The total number of denoising passes can vary in different cases: some examples may use 40 passes for a relatively lightweight video generation process, whereas a greater number of passes can be used in other scenarios, such as 80, 128, or 256 passes.

At operation 710, later denoising passes are performed, during which the model's denoising process is not conditioned on the camera activations. In some examples, operation 710 corresponds to the configuration shown in FIG. 4, where the video diffusion model 212 operates without the camera conditioning branch 214. After the initial portion (e.g., 20%) of denoising passes, the remaining portion (e.g., the remaining 80% of passes) of denoising passes are performed, during which the model further de-noises the video data using the video diffusion model 212 without camera conditioning, as the camera motion has already been established.

The transition between the configurations shown in FIG. 3 and FIG. 4 occurs because research has shown that camera motion is primarily determined in the early portion of the denoising process. Low-frequency motion components (which include camera motion) fill up to approximately 84% at t=0.9, which corresponds to the first 10% of the rectified flow denoising process. By restricting camera conditioning to only these early denoising passes, the method 700 can achieve improved visual quality (by approximately 15% in some cases) and better camera control accuracy (by approximately 30% in some cases).

The operations of the method 700 may be performed in various orders, or concurrently, or omitted entirely, depending on the specific implementation and requirements. For example, operations 702, 704, and 706 may be performed in a different sequence than shown, or may be performed simultaneously where processing capabilities permit. In some implementations, certain operations may be combined or subdivided into additional steps. The camera conditioning during initial denoising passes (operation 708) and the absence of camera conditioning during later passes (operation 710) may be implemented with varying thresholds for what constitutes initial versus later passes, such as using the first 10%, 20%, or 40% of passes for camera conditioning. Additionally, the specific subset of video DiT blocks that receive camera conditioning may vary across implementations, such as using the first 8 blocks out of 32 (25%) or another proportion based on the specific model architecture. Some operations may be performed iteratively or recursively, such as operation 704 and operation 706 (which are performed in alternation for each paired V-DiT block 302 and camera block 304), and some examples include additional operations not explicitly shown in the flowchart, such as preprocessing steps for the camera trajectory information, text data, and/or video data, and/or post-processing steps for the generated video.

Figure 8:
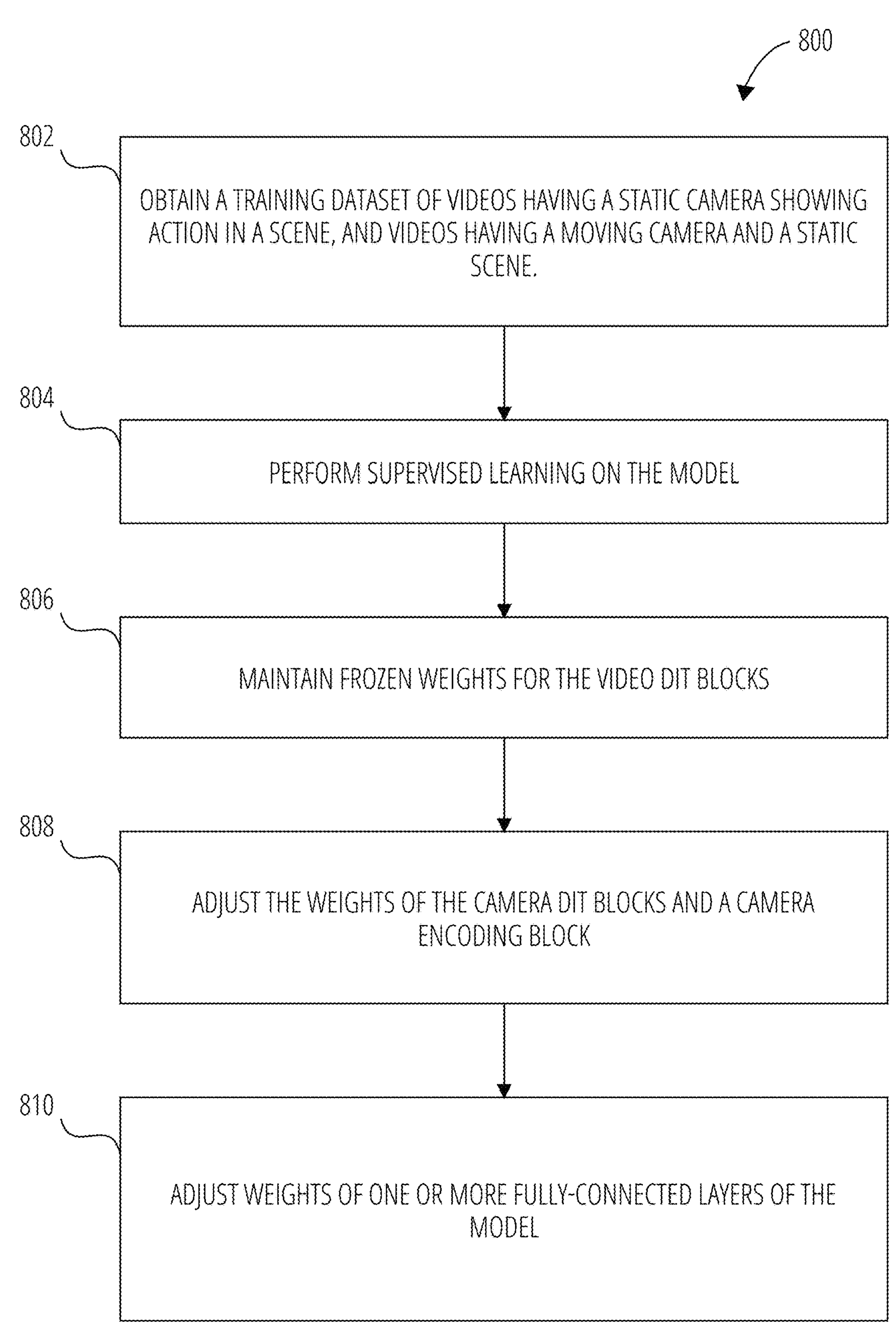
FIG. 8 is a flowchart illustrating a method for training a camera-conditioned video diffusion transformer model, according to some examples.

FIG. 8 is a flowchart illustrating a method 800 for training a camera-conditioned video diffusion transformer model.

The operations of method 800 are described below with reference to the VDiT-CC model 200 described above. However, it will be appreciated that the method 800 can potentially be applied to models having different architectures or components in different examples.

The method 800 begins with operation 802, which involves obtaining a training dataset of videos having a static camera showing action in a scene, and videos having a moving camera and a static scene. This operation 802 addresses the challenge of finding suitable training data for camera control: existing datasets, such as the RealEstate10K dataset consisting of video tours of largely static real estate properties, are heavily biased toward static scenes with varying camera trajectories. In some examples, the training dataset obtained at operation 802 combines a first set of videos (e.g., approximately 65K videos) from RealEstate10K (which contain diverse camera trajectories but static scenes) with a second set of videos (e.g., approximately 20K videos) obtained as a curated collection of videos from various sources featuring dynamic scenes captured by stationary cameras (where camera parameters are known, because the camera doesn't move). It will be appreciated that various combinations or mixtures of static scene and static camera videos can be used to assemble the training dataset in various examples.

Operation 804 involves performing supervised learning on the model. This supervised learning process uses the combined dataset to train the camera-conditioned video DiT model, such as VDiT-CC model 200, specifically focusing on training the camera conditioning branch (e.g., camera conditioning branch 214) while keeping the main video DiT backbone (e.g., video diffusion model 212) frozen. In some examples, the supervised learning can be performed using a rectified flow objective with a modified noise distribution that focuses on the early portion of the denoising process where camera motion is established.

Operation 806 specifies maintaining frozen weights for the pretrained video DiT blocks (e.g., V-DiT block 302) during the supervised learning process. This approach preserves the pretrained knowledge in the video DiT model while allowing the camera conditioning components to be trained. By keeping the video DiT blocks frozen, the model retains its ability to generate high-quality videos while gaining the ability to follow camera trajectories.

Operation 808 involves adjusting the weights of the camera DiT blocks (e.g., C-DiT block 512) and a camera encoding block (e.g., temporal encoding block 504 of the camera preprocessor 306) during the supervised learning. This targeted training approach reduces the number of trainable parameters by approximately 4 times compared to training the entire model.

Operation 810 involves adjusting weights of one or more fully-connected layers of the model during the supervised learning. These fully-connected layers can include the fully connected layers 514 in the camera blocks 304 and/or the fully connected layer 506 in the camera preprocessor 306, as shown in FIG. 5. These layers mediate between other components of the camera conditioning branch and are used for transforming the camera information into a format that can effectively condition the video generation process.

Figure 9:
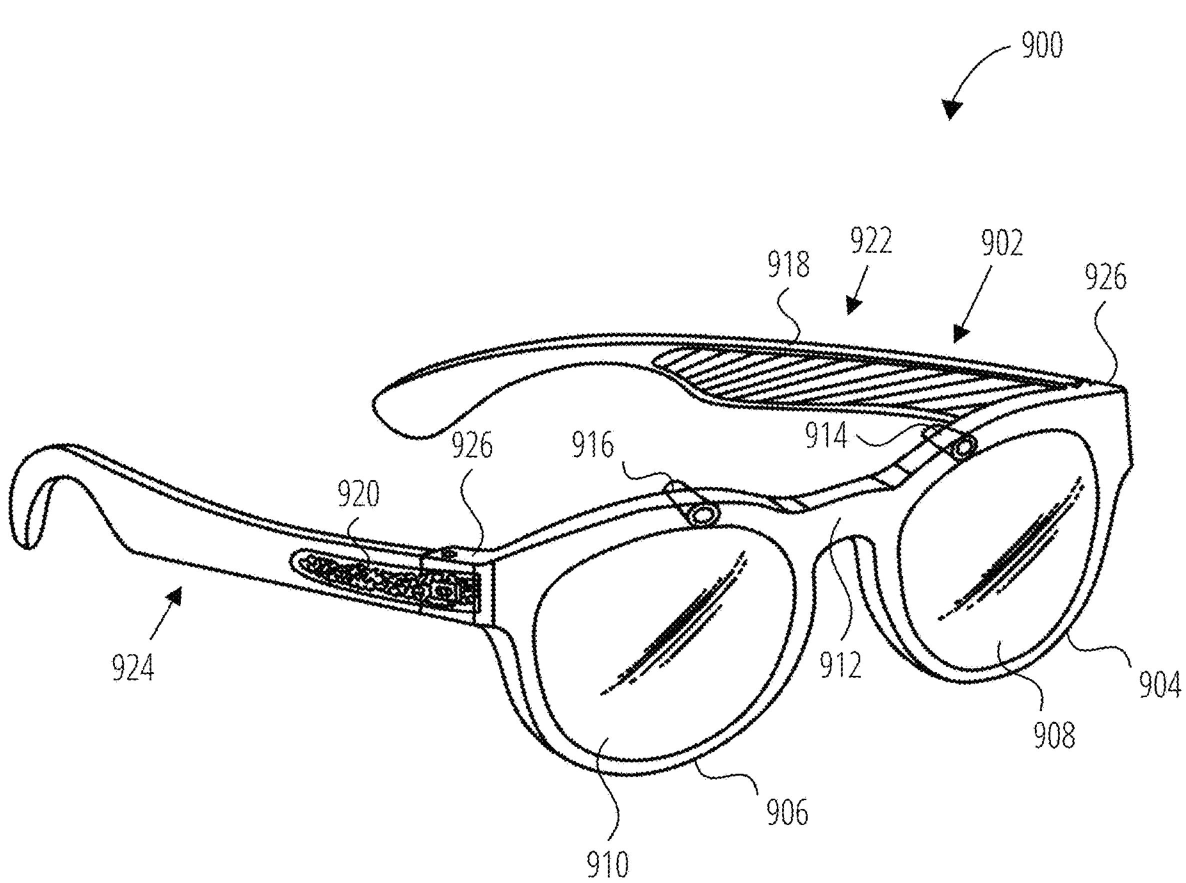
FIG. 9 is a perspective view of a head-worn device, in accordance with some examples.

FIG. 9 is a perspective view of a head-worn XR device (e.g., a display system 900 shown as XR glasses), in accordance with some examples. The display system 900, in this instance, can be worn to view augmented or virtual content displayed over real content visible in a content interaction system.

The display system 900 can include a frame 902 made from any suitable material such as plastic or metal, including any suitable shape memory alloy, as is well known for ophthalmic eyewear. In one or more examples, the frame 902 includes a first or left optical element holder 904 (e.g., a display or lens holder) and a second or right optical element holder 906 (e.g., a display or lens holder) connected by a bridge 912. A first or left optical element 908 and a second or right optical element 910 can be provided within respective left optical element holder 904 and right optical element holder 906. The right optical element 910 and the left optical element 908 can be a lens, a display, a display assembly, or a combination of the foregoing. Any suitable display assembly can be provided in the display system 900. The right optical element 910 and the left optical element 908 can each be considered to provide a display configured to present an image at a virtual image surface having a plurality of virtual image surface locations, as described below with reference to FIG. 10.

The frame 902 additionally includes a left arm or temple piece 922 and a right arm or temple piece 924. In some examples the frame 902 can be formed from a single piece of material so as to have a unitary or integral construction.

In some examples, some of the optical elements, such as the projector, waveguide, and other components of the display system 900 are mounted in a separately assembled optical support system. The optical support system includes a monocular chassis that integrates optical components such as the projector, waveguide, and other components into a single sub-assembly. In some examples, the optical support system is provided as a sub-assembly in two versions, left handed and right handed that make up a binocular pair and can be installed into the frame 902, for example into the first or left optical element holder 904 and the second or right optical element holder 906, respectively.

The display system 900 can include a computing device, such as a computer 920 having a processor and a memory storing instructions for execution by the processor. The computer 920 can be of any suitable type so as to be carried by the frame 902 and, in one or more examples, of a suitable size and shape so as to be partially disposed in one of the left temple piece 922 or the right temple piece 924. The computer 920 can include one or more processors with memory, wireless communication circuitry, and a power source. Various other examples may include these elements in different configurations or integrated together in different ways. In some examples, the computer 920 can be implemented by a machine 1500 or machine 1604 as described below with reference to FIG. 15 or FIG. 16.

The computer 920 additionally includes a battery 918 or other suitable portable power supply. In some examples, the battery 918 is disposed in the left temple piece 922 and is electrically coupled to the computer 920 disposed in the right temple piece 924, or vice versa. The display system 900 can include a connector or port (not shown) suitable for charging the battery 918, a wireless receiver, transmitter or transceiver (not shown), or a combination of such devices.

The display system 900 can include a first or left camera 914 and a second or right camera 916. Although two cameras are depicted, other examples contemplate the use of a single or additional (i.e., more than two) cameras. In one or more examples, the display system 900 can include any number of input sensors or other input/output devices in addition to the left camera 914 and the right camera 916, such as location sensors, motion sensors, and so forth. It will be appreciated that the cameras 914, 916 are a form of optical sensor, and that the display system 900 can include additional types of optical sensors in some examples.

Figure 10:
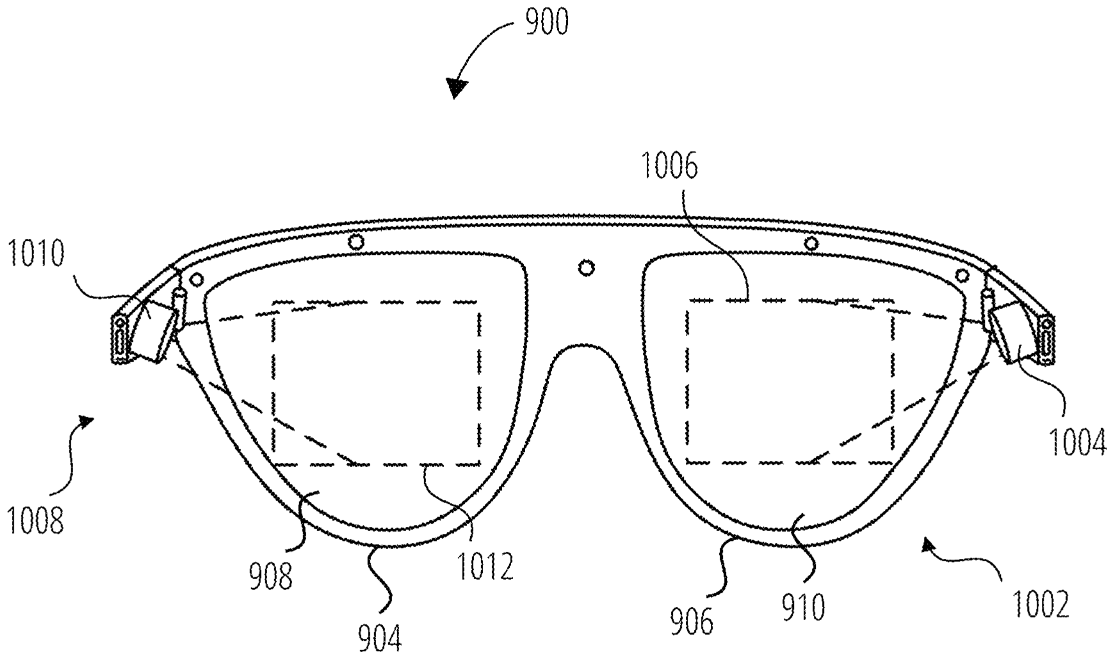
FIG. 10 illustrates a further view of the head-worn device of FIG. 9, in accordance with some examples.

FIG. 10 illustrates the display system 900 from the perspective of a user. For clarity, a number of the elements shown in FIG. 9 have been omitted. As described in FIG. 9, the display system 900 shown in FIG. 10 includes left optical element 908 and right optical element 910 secured within the left optical element holder 904 and the right optical element holder 906, respectively.

The display system 900 include right forward optical assembly 1002 comprising a right projector 1004 and a right display device 1006, and a left forward optical assembly 1008 including a left projector 1010 and a left display device

1012. The right forward optical assembly 1002 (with or without right optical element 910) may be referred to herein as a right near-eye display, the left forward optical assembly 1008 (with or without left optical element 908) may be referred to herein as a left near-eye display, and each may be referred to herein as a near-eye display or a near-eye optical see-through XR display.

In some examples, the right display devices 1006 are waveguides. The waveguides include reflective or diffractive structures (e.g., gratings, holograms and/or optical elements such as mirrors, lenses, or prisms). Projected light emitted by the right projector 1004 encounters the diffractive structures of the waveguide of the right display device 1006, which directs the light towards the right eye of a user to provide an image (e.g., a right-eye image) on or in the right optical element 910 that overlays the view of the real world seen by the user. Similarly, projected light emitted by the left projector 1010 encounters the diffractive structures of the waveguide of the left display device 1012, which directs the light towards the left eye of a user to provide an image (e.g., a left-eye image) on or in the left optical element 908 that overlays the view of the real world seen by the user. The combination of a graphics processing unit (GPU), the right forward optical assembly 1002, the left forward optical assembly 1008, the left optical element 908, and the right optical element 910 provide an optical engine of the display system 900. The display system 900 uses the optical engine to generate an overlay of the real world view of the user, including display of a 3D user interface to the user of the display system 900. The surface of the optical element 908 or 910 from which the projected light exits toward the user's eye is referred to as a user-facing surface, an image presentation surface, an eye-side surface, an eye-facing surface, or a display surface of the near-eye optical see-through XR display, whereas the opposite side of the optical element 908 or 910 may be referred to as a world-side surface or world-facing surface. The light exits the image presentation surface of the waveguide at one or more exit pupil locations; at each exit pupil location, the different portions of the image exit at different angles. As a result of the angles at which the light exits the exit pupils toward the user's eye, the image is perceived by a user as extending across a surface in space, referred to herein as a virtual image surface. The virtual image surface is a surface in physical space where the user's eyes converge and focus to view the image; thus, the position and shape of the virtual image surface is a function of the physical properties of the light propagating from the waveguide surface toward the user's eyes.

It will be appreciated that other display technologies or configurations may be utilized within an optical engine to display an image to a user in the user's field of view. For example, instead of a projector 1004 and a waveguide, a liquid crystal display (LCD), light emitting diode (LED) array, or other display type may be provided. In some examples, one or more liquid crystal on silicon (LCOS) panels can be used to modulate reflection of light of one or more colors to define individual pixels of the images presented by each display and thereby propagate the colors of light forming the images to various locations across one or more virtual image surfaces. In some examples, one or more LED arrays can be used to emit light of one or more colors from each of an array of LED pixels, thereby propagating the light of one or more colors to various display surface locations. In display types using a conventional 2D screen to present light toward the user's eyes, the virtual image surface can be considered to be identical to the 2D surface of the screen.

In use, a user of the display system 900 will be presented with information, content, and various 3D user interfaces on the near eye displays. The user can then interact with the display system 900 using various input modalities, including the buttons 926, voice inputs or touch inputs on an associated device, and/or hand movements, locations, and positions detected by the display system 900. In some examples, the display system 900 can include additional input devices, such as microphones, touchpads, optical or depth sensors used for gesture recognition, an inertial measurement unit (IMU) used for head motion detection, and so on.

Figure 11:
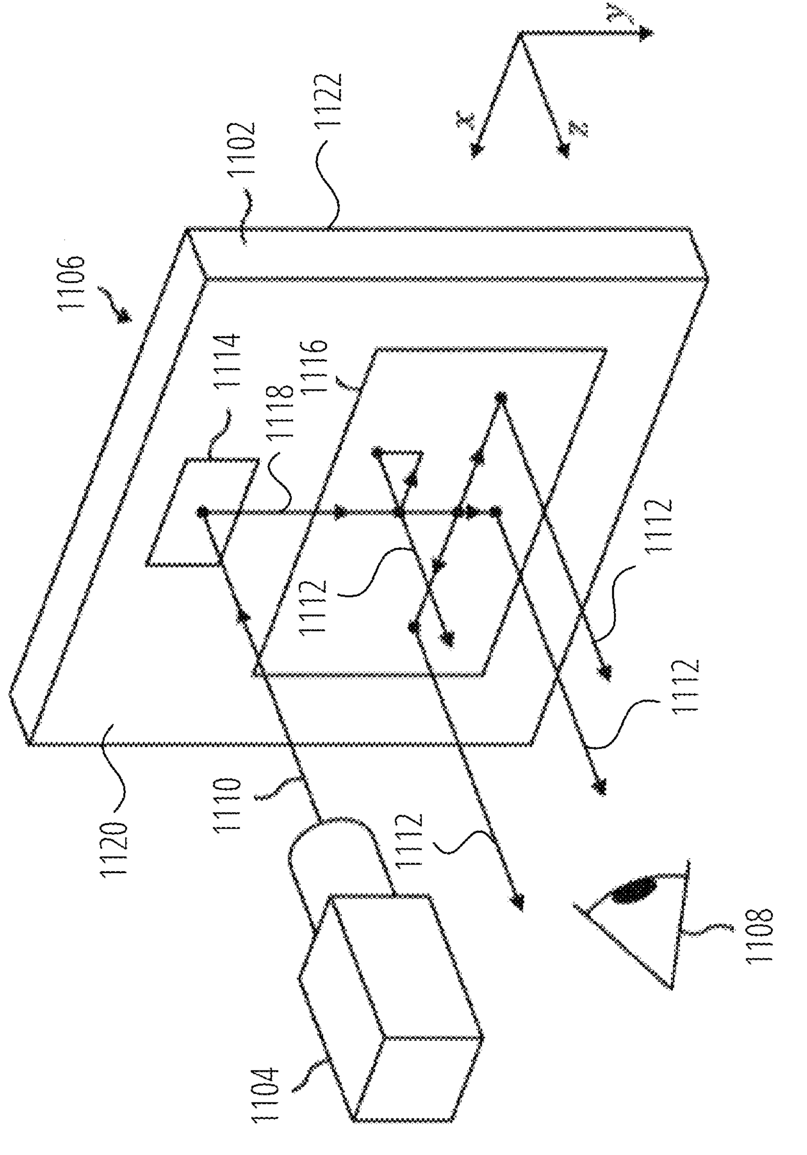
FIG. 11 illustrates a perspective view of a projector and waveguide, showing light propagated toward an eye, in accordance with some examples.

FIG. 11 shows a perspective view of a projector 1104 emitting projected light 1110 (represented in FIG. 11 as a single ray) into a display device 1106. The simplified diagram of FIG. 11 illustrates principles that can be used to implement waveguide-based displays, such as those used by the display system 900.

The display device 1106 includes a waveguide 1102 or light guide. The waveguide 1102 guides light via repeated total internal reflections from opposing surfaces of the waveguide 1102. In the configuration of FIG. 11, the waveguide 1102 can be configured as a planar waveguide or a slab waveguide, such as disposed in the x-y plane. The surfaces can be generally flat or planar surfaces that are parallel to each other and extend in the x-y plane, although in some cases the surface may exhibit curvature. One of the surfaces (e.g., a display surface 1120) can face an eye 1108 of the user. The other of the surfaces (e.g., an opposite surface 1122, also referred to as the world-facing surface) can face away from the eye 1108 of the user.

The waveguide 1102 can include one or more diffractive and/or reflective structures, which can receive the projected light 1110 from the projector 1104, redirect the projected light 1110 internally within the waveguide 1102, and extract the projected light 1110 from the waveguide 1102 to form exiting light 1112. For example, the waveguide 1102 can include one or more diffraction gratings and/or diffraction grating regions, such as a single diffraction grating structure that has individual regions that can function as if they were separate diffraction gratings. The waveguide 1102 can include one or more reflective structures, such as mirrors, prisms, and/or reflective gratings. The waveguide 1102 can include one or more transmissive structures, such as transmissive gratings. The waveguide 1102 can include one or more light-focusing (or collimating-changing) optical elements, such as lenses. Any or all of these structures or elements can be included on one or both surfaces of the waveguide 1102 or in an interior of the waveguide 1102.

In the configuration of FIG. 11, the waveguide 1102 can include an input grating 1114, which can receive the projected light 1110 from the projector 1104 and direct the projected light 1110 into the waveguide 1102 to form light 1118. The waveguide 1102 can include an output grating 1116, which can receive the light 1118, split and redirect the light 1118 internally to extend over a relatively large area (compared to the input grating 1114), and direct the light 1118 out of the waveguide 1102 to form the exiting light 1112. The terms "grating" or "diffraction grating" are used herein to refer to any pattern of diffractive structures or diffractive features. In some examples, the input grating 1114 can be replaced with any component that couples light into the waveguide 1102 such that the light propagates within the waveguide 1102 by total internal reflection. The redirections and splitting can occur from multiple (sequential) interactions with a single diffraction grating, or from sequential interactions with different gratings that are disposed within the surface area of the output grating 1116. For example, a light ray can be diffracted into the waveguide 1102 by the input grating 1114 and be caused to totally internally reflect from one surface of the waveguide 1102 to the other in a direction toward the output grating 1116. The light 1118 can then interact with diffractive features of the output grating 1116 on or within the waveguide 1102. A portion of light 1118 is diffracted laterally within the plane of the waveguide 1102 thereby replicating the image across the area of the output grating 1116, due to multiple interactions with diffractive features that exist across the output grating 1116. Another portion of light 1118 is directed out of the waveguide by diffraction grating 1116 toward the eye 1108 as light 1112. The interactions with the diffractive features of the output grating 1116 can cause internal rays or internal light beams in the waveguide 1102 to change direction within the waveguide 1102. Eventually, the interactions with the diffractive features can cause the internal rays or internal light beams to exit the waveguide 1102 to propagate toward the eye 1108 of the user.

In some examples, the waveguide 1102 can be configured to operate at infinite conjugates. For example, the projector 1104 can project light that forms an image infinitely far away, so that the light would appear in focus on a screen placed relatively far from the projector 1104. Similarly, the output grating 1116 can direct the exiting light 1112 toward the eye in such a manner that the image appears to be infinitely far away to the eye 1108 of the user. For such an infinite-conjugate arrangement, angles in the space of the light that enters and exits the waveguide 1102 can correspond uniquely to image locations in the image. For example, the propagation angles of the light can map uniquely to the propagation angles of the exiting light 1112, which in turn can map uniquely to the image locations in the image at the retina of the eye 1108 of the user.

The waveguide 1102 can make use of this infinite-conjugate relationship to perform so-called "pupil replication" or "pupil expansion". The projector 1104 can be configured to have an exit pupil that coincides with the input grating 1114. The internal splitting and redirections within the output grating 1116 can effectively expand a surface area of the exit pupil, while maintaining the unique mapping of propagation angle to image location for light in the pupil, and thereby maintaining the unique mapping of virtual image surface location to image location. The size of the output grating 1116 (e.g., an area covered by the replicated pupils, as constrained within a surface area of the output grating 1116) can be larger than a pupil of the eye 1108 of the user, so that if the pupil of the eye 1108 moves, such as caused by the user changing a gaze direction, the amount of light entering the pupil of the eye 1108 may not vary significantly, and the user may not perceive a change in brightness of the image.

Networked Computing Environment

Figure 12:
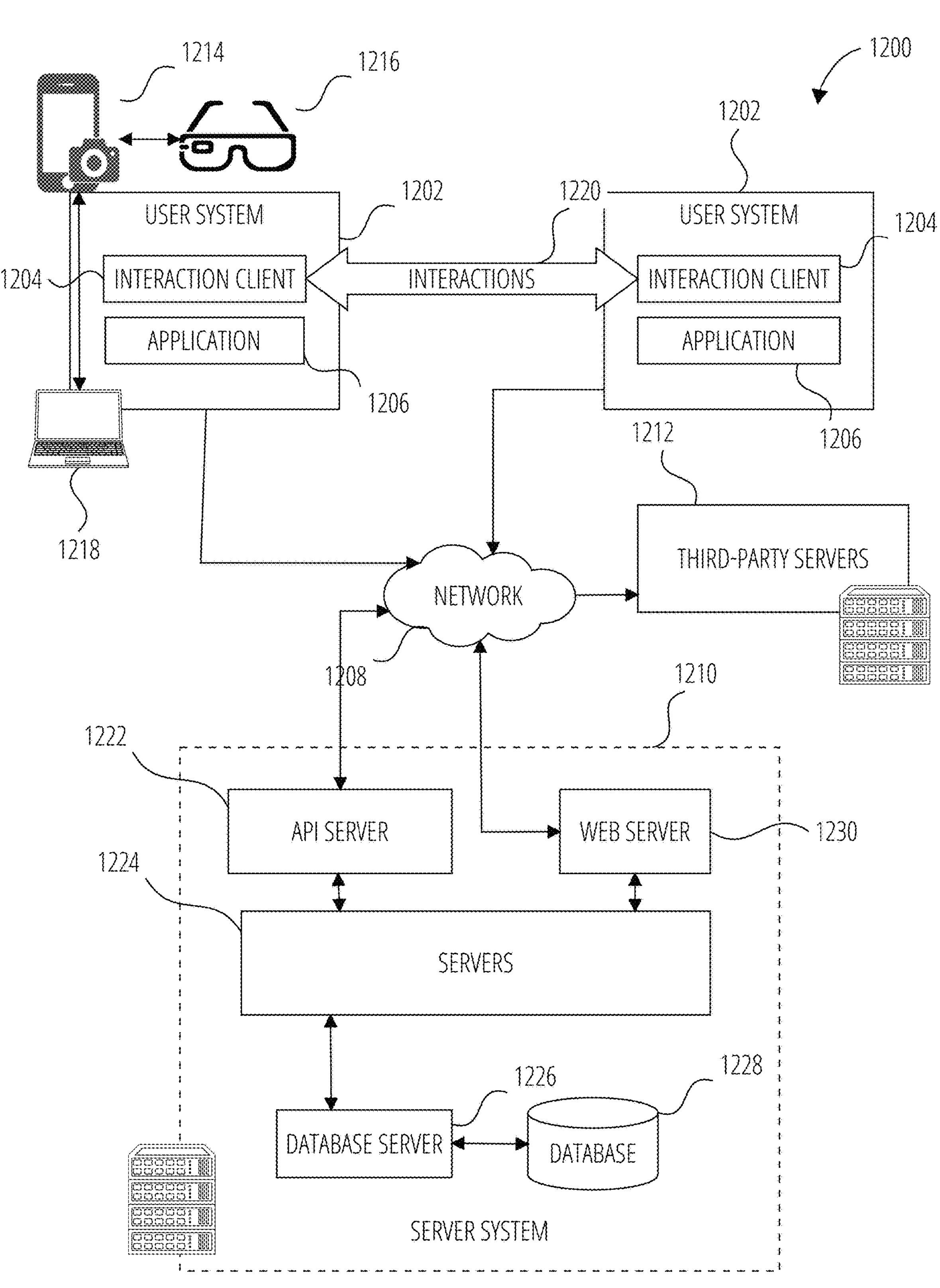
FIG. 12 is a diagrammatic representation of a networked environment in which the present disclosure may be deployed, according to some examples.

FIG. 12 is a block diagram showing an example digital interaction system 1200 for facilitating interactions and engagements (e.g., exchanging text messages, conducting text audio and video calls, or playing games) over a network. The digital interaction system 1200 includes multiple user systems 1202, each of which hosts multiple applications, including an interaction client 1204 and other applications 1206. Each interaction client 1204 is communicatively coupled, via one or more networks including a Network 1208 (e.g., the Internet), to other instances of the interaction client 1204 (e.g., hosted on respective other user systems 1202), a server system 1210 and third-party servers 1212). An interaction client 1204 can also communicate with locally hosted applications 1206 using Applications Program Interfaces (APIs).

Each user system 1202 may include multiple user devices, such as a mobile device 1214, head-wearable apparatus 1216 (such as display system 900), and a computer client device 1218 that are communicatively connected to exchange data and messages.

An interaction client 1204 interacts with other interaction clients 1204 and with the server system 1210 via the Network 1208. The data exchanged between the interaction clients 1204 (e.g., interactions 1220) and between the interaction clients 1204 and the server system 1210 includes functions (e.g., commands to invoke functions) and payload data (e.g., text, audio, video, or other multimedia data).

The server system 1210 provides server-side functionality via the Network 1208 to the interaction clients 1204. While certain functions of the digital interaction system 1200 are described herein as being performed by either an interaction client 1204 or by the server system 1210, the location of certain functionality either within the interaction client 1204 or the server system 1210 may be a design choice. For example, it may be technically preferable to initially deploy particular technology and functionality within the server system 1210 but to later migrate this technology and functionality to the interaction client 1204 where a user system 1202 has sufficient processing capacity.

The server system 1210 supports various services and operations that are provided to the interaction clients 1204. Such operations include transmitting data to, receiving data from, and processing data generated by the interaction clients 1204. This data may include message content, client device information, geolocation information, digital effects (e.g., media augmentation and overlays), message content persistence conditions, entity relationship information, and live event information. Data exchanges within the digital interaction system 1200 are invoked and controlled through functions available via user interfaces (UIs) of the interaction clients 1204.

Turning now specifically to the server system 1210, an Application Program Interface (API) server 1222 is coupled to and provides programmatic interfaces to servers 1224, making the functions of the servers 1224 accessible to interaction clients 1204, other applications 1206 and third-party server 1212. The servers 1224 are communicatively coupled to a database server 1226, facilitating access to a database 1228 that stores data associated with interactions processed by the servers 1224. Similarly, a web server 1230 is coupled to the servers 1224 and provides web-based interfaces to the servers 1224. To this end, the web server 1230 processes incoming network requests over the Hypertext Transfer Protocol (HTTP) and several other related protocols.

The Application Program Interface (API) server 1222 receives and transmits interaction data (e.g., commands and message payloads) between the servers 1224 and the user systems 1202 (and, for example, interaction clients 1204 and other application 1206) and the third-party server 1212. Specifically, the Application Program Interface (API) server 1222 provides a set of interfaces (e.g., routines and protocols) that can be called or queried by the interaction client 1204 and other applications 1206 to invoke functionality of the servers 1224. The Application Program Interface (API) server 1222 exposes various functions supported by the servers 1224, including account registration; login functionality; the sending of interaction data, via the servers 1224, from a particular interaction client 1204 to another interaction client 1204; the communication of media files (e.g., images or video) from an interaction client 1204 to the servers 1224; the settings of a collection of media data (e.g., a narrative); the retrieval of a list of friends of a user of a user system 1202; the retrieval of messages and content; the addition and deletion of entities (e.g., friends) to an entity relationship graph; the location of friends within an entity relationship graph; and opening an application event (e.g., relating to the interaction client 1204).

The servers 1224 host multiple systems and subsystems, described below with reference to FIG. 13.

External Recourses and Linked Applications

The interaction client 1204 provides a user interface that allows users to access features and functions of an external resource, such as a linked application 1206, an applet, or a microservice. This external resource may be provided by a third party or by the creator of the interaction client 1204.

The external resource may be a full-scale application installed on the user's system 1202, or a smaller, lightweight version of the application, such as an applet or a microservice, hosted either on the user's system or remotely, such as on third-party servers 1212 or in the cloud. These smaller versions, which include a subset of the full application's features, may be implemented using a markup-language document and may also incorporate a scripting language and a style sheet.

When a user selects an option to launch or access the external resource, the interaction client 1204 determines whether the resource is web-based or a locally installed application. Locally installed applications can be launched independently of the interaction client 1204, while applets and microservices can be launched or accessed via the interaction client 1204.

If the external resource is a locally installed application, the interaction client 1204 instructs the user's system to launch the resource by executing locally stored code. If the resource is web-based, the interaction client 1204 communicates with third-party servers to obtain a markup-language document corresponding to the selected resource, which it then processes to present the resource within its user interface.

The interaction client 1204 can also notify users of activity in one or more external resources. For instance, it can provide notifications relating to the use of an external resource by one or more members of a user group. Users can be invited to join an active external resource or to launch a recently used but currently inactive resource.

The interaction client 1204 can present a list of available external resources to a user, allowing them to launch or access a given resource. This list can be presented in a context-sensitive menu, with icons representing different applications, applets, or microservices varying based on how the menu is launched by the user.

System Architecture

Figure 13:
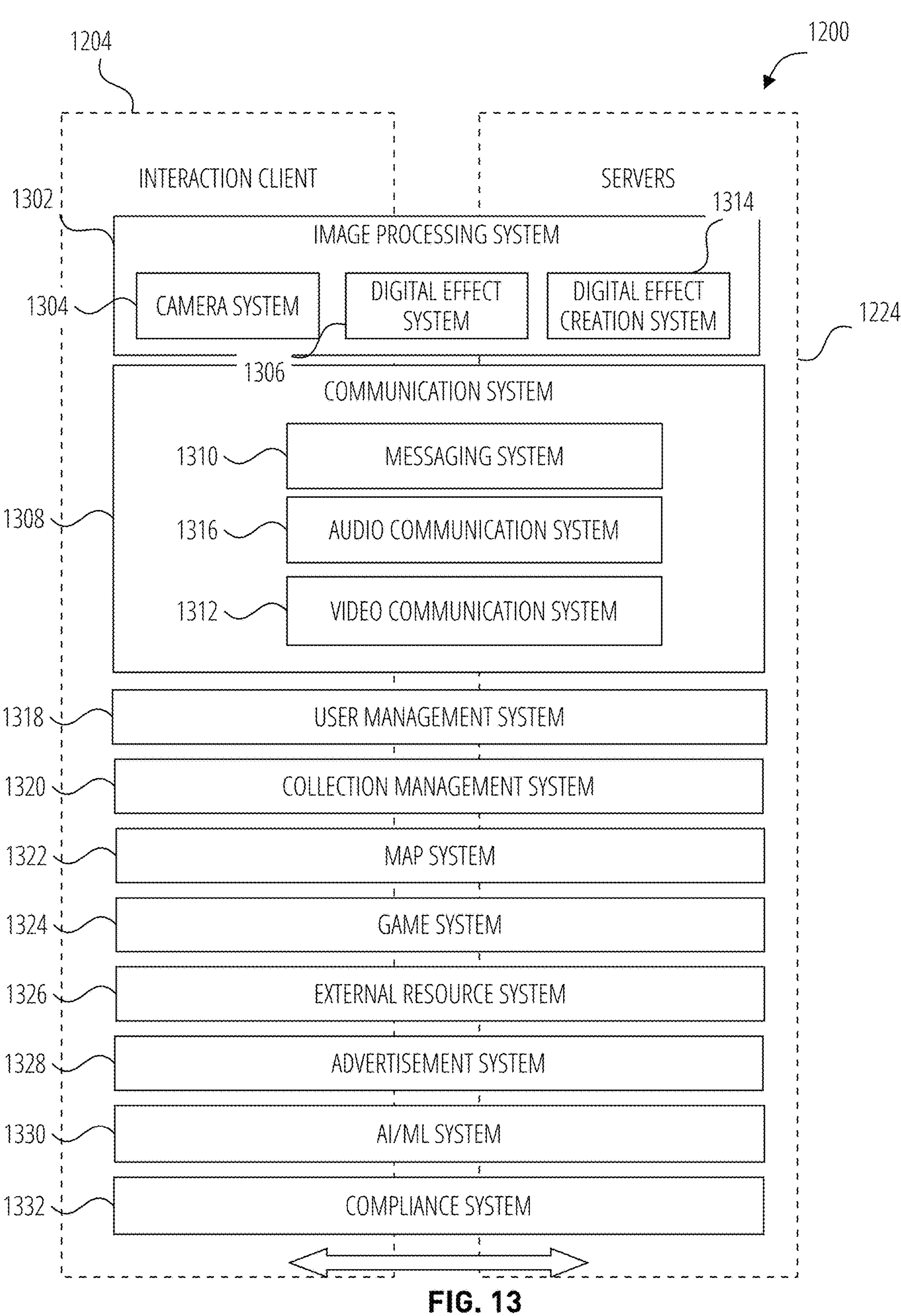
FIG. 13 is a diagrammatic representation of a digital interaction system that has both client-side and server-side functionality, according to some examples.

FIG. 13 is a block diagram illustrating further details regarding the digital interaction system 1200, according to some examples. Specifically, the digital interaction system 1200 is shown to comprise the interaction client 1204 and the servers 1224. The digital interaction system 1200 embodies multiple subsystems, which are supported on the client-side by the interaction client 1204 and on the server-side by the servers 1224. In some examples, these subsystems are implemented as microservices. A microservice subsystem (e.g., a microservice application) may have components that enable it to operate independently and communicate with other services. Example components of microservice subsystem may include:

- Function logic: The function logic implements the functionality of the microservice subsystem, representing a specific capability or function that the microservice provides.
- API interface: Microservices may communicate with each other components through well-defined APIs or interfaces, using lightweight protocols such as REST or messaging. The API interface defines the inputs and outputs of the microservice subsystem and how it interacts with other microservice subsystems of the digital interaction system 1200.
- Data storage: A microservice subsystem may be responsible for its own data storage, which may be in the form of a database, cache, or other storage mechanism (e.g., using the database server 1226 and database 1228). This enables a microservice subsystem to operate independently of other microservices of the digital interaction system 1200.
- Service discovery: Microservice subsystems may find and communicate with other microservice subsystems of the digital interaction system 1200. Service discovery mechanisms enable microservice subsystems to locate and communicate with other microservice subsystems in a scalable and efficient way.
- Monitoring and logging: Microservice subsystems may need to be monitored and logged to ensure availability and performance. Monitoring and logging mechanisms enable the tracking of health and performance of a microservice subsystem.

In some examples, the digital interaction system 1200 may employ a monolithic architecture, a service-oriented architecture (SOA), a function-as-a-service (FaaS) architecture, or a modular architecture:

Example subsystems are discussed below.

An image processing system 1302 provides various functions that enable a user to capture and modify (e.g., augment, annotate or otherwise edit) media content associated with a message.

A camera system 1304 includes control software (e.g., in a camera application) that interacts with and controls hardware camera hardware (e.g., directly or via operating system controls) of the user system 1202 to modify real-time images captured and displayed via the interaction client 1204.

The digital effect system 1306 provides functions related to the generation and publishing of digital effects (e.g., media overlays) for images captured in real-time by cameras of the user system 1202 or retrieved from memory of the user system 1202. For example, the digital effect system 1306 operatively selects, presents, and displays digital effects (e.g., media overlays such as image filters or modifications) to the interaction client 1204 for the modification of real-time images received via the camera system 1304 or stored images retrieved from memory 1402 of a user system 1202. These digital effects are selected by the digital effect system 1306 and presented to a user of an interaction client 1204, based on a number of inputs and data, such as for example:

- Geolocation of the user system 1202; and
- Entity relationship information of the user of the user system 1202.

Digital effects may include audio and visual content and visual effects. Examples of audio and visual content include pictures, texts, logos, animations, and sound effects.

Examples of visual effects include color overlays and media overlays. The audio and visual content or the visual effects can be applied to a media content item (e.g., a photo or video) at user system 1202 for communication in a message, or applied to video content, such as a video content stream or feed transmitted from an interaction client 1204. As such, the image processing system 1302 may interact with, and support, the various subsystems of the communication system 1308, such as the messaging system 1310 and the video communication system 1312.

A media overlay may include text or image data that can be overlaid on top of a photograph taken by the user system 1202 or a video stream produced by the user system 1202. In some examples, the media overlay may be a location overlay (e.g., Venice beach), a name of a live event, or a name of a merchant overlay (e.g., Beach Coffee House). In further examples, the image processing system 1302 uses the geolocation of the user system 1202 to identify a media overlay that includes the name of a merchant at the geolocation of the user system 1202. The media overlay may include other indicia associated with the merchant. The media overlays may be stored in the databases 1228 and accessed through the database server 1226.

The image processing system 1302 provides a user-based publication platform that enables users to select a geolocation on a map and upload content associated with the selected geolocation. The user may also specify circumstances under which a particular media overlay should be offered to other users. The image processing system 1302 generates a media overlay that includes the uploaded content and associates the uploaded content with the selected geolocation.

The digital effect creation system 1314 supports augmented reality developer platforms and includes an application for content creators (e.g., artists and developers) to create and publish digital effects (e.g., augmented reality experiences) of the interaction client 1204. The digital effect creation system 1314 provides a library of built-in features and tools to content creators including, for example custom shaders, tracking technology, and templates.

In some examples, the digital effect creation system 1314 provides a merchant-based publication platform that enables merchants to select a particular digital effect associated with a geolocation via a bidding process. For example, the digital effect creation system 1314 associates a media overlay of the highest bidding merchant with a corresponding geolocation for a predefined amount of time.

In some examples, the digital effect creation system 1314 can include the audio generator 106, a POV transformation component, and/or a temporal transformation component as described above. The audio generator 106 can be used to generate a 4D scene model 114 based on inputs received from various components of a digital interaction system 1200, such as text data, image data, pre-existing video data, or video data captured by the camera system 1304. In some examples, the audio generator 106, a POV transformation component, and/or a temporal transformation component can be implemented by other systems of the image processing system 1302, the digital interaction system 1200, or other components of a computing system.

The POV transformation component and/or temporal transformation component, or components thereof, can be used to generate views of a 4D scene using the generated 4D scene model 114. For example, the transformation component and/or temporal transformation component can use the 4D scene model 114 to dynamically generate views of a scene for use as visual overlays or videos in an XR system as described above. It will be appreciated that the transformation component and/or temporal transformation component can generate a 4D scene model 114, and/or generate interactive or non-interactive content based on a 4D scene model 114, for use by (or using inputs from) one or more other subsystems or components of the systems or devices described herein, such as the game system 1324, the image processing system 1302, the digital effect system 1306, and so on.

A communication system 1308 is responsible for enabling and processing multiple forms of communication and interaction within the digital interaction system 1200 and includes a messaging system 1310, an audio communication system 1316, and a video communication system 1312. The messaging system 1310 is responsible, in some examples, for enforcing the temporary or time-limited access to content by the interaction clients 1204. The messaging system 1310 incorporates multiple timers that, based on duration and display parameters associated with a message or collection of messages (e.g., a narrative), selectively enable access (e.g., for presentation and display) to messages and associated content via the interaction client 1204. The audio communication system 1316 enables and supports audio communications (e.g., real-time audio chat) between multiple interaction clients 1204. Similarly, the video communication system 1312 enables and supports video communications (e.g., real-time video chat) between multiple interaction clients 1204.

A user management system 1318 is operationally responsible for the management of user data and profiles, and maintains entity information regarding users and relationships between users of the digital interaction system 1200.

A collection management system 1320 is operationally responsible for managing sets or collections of media (e.g., collections of text, image video, and audio data). A collection of content (e.g., messages, including images, video, text, and audio) may be organized into an "event gallery" or an "event collection." Such a collection may be made available for a specified time period, such as the duration of an event to which the content relates. For example, content relating to a music concert may be made available as a "concert collection" for the duration of that music concert. The collection management system 1320 may also be responsible for publishing an icon that provides notification of a particular collection to the user interface of the interaction client 1204. The collection management system 1320 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 1320 employs machine vision (or image recognition technology) and content rules to curate a content collection automatically. In certain examples, compensation may be paid to a user to include user-generated content into a collection. In such cases, the collection management system 1320 operates to automatically make payments to such users to use their content.

A map system 1322 provides various geographic location (e.g., geolocation) functions and supports the presentation of map-based media content and messages by the interaction client 1204. For example, the map system 1322 enables the display of user icons or avatars on a map to indicate a current or past location of "friends" of a user, as well as media content (e.g., collections of messages including photographs and videos) generated by such friends, within the context of a map. For example, a message posted by a user to the digital interaction system 1200 from a specific geographic location may be displayed within the context of a map at that particular location to "friends" of a specific user on a map interface of the interaction client 1204. A user can furthermore share his or her location and status information (e.g., using an appropriate status avatar) with other users of the digital interaction system 1200 via the interaction client 1204, with this location and status information being similarly displayed within the context of a map interface of the interaction client 1204 to selected users.

A game system 1324 provides various gaming functions within the context of the interaction client 1204. The interaction client 1204 provides a game interface providing a list of available games that can be launched by a user within the context of the interaction client 1204 and played with other users of the digital interaction system 1200. The digital interaction system 1200 further enables a particular user to invite other users to participate in the play of a specific game by issuing invitations to such other users from the interaction client 1204. The interaction client 1204 also supports audio, video, and text messaging (e.g., chats) within the context of gameplay, provides a leaderboard for the games, and supports the provision of in-game rewards (e.g., coins and items).

An external resource system 1326 provides an interface for the interaction client 1204 to communicate with remote servers (e.g., third-party servers 1212) to launch or access external resources, i.e., applications or applets. Each third-party server 1212 hosts, for example, a markup language (e.g., HTML5) based application or a small-scale version of an application (e.g., game, utility, payment, or ride-sharing application). The interaction client 1204 may launch a web-based resource (e.g., application) by accessing the HTML5 file from the third-party servers 1212 associated with the web-based resource. Applications hosted by third-party servers 1212 are programmed in JavaScript leveraging a Software Development Kit (SDK) provided by the servers 1224. The SDK includes Application Programming Interfaces (APIs) with functions that can be called or invoked by the web-based application. The servers 1224 host a JavaScript library that provides a given external resource access to specific user data of the interaction client 1204. HTML5 is an example of technology for programming games, but applications and resources programmed based on other technologies can be used.

To integrate the functions of the SDK into the web-based resource, the SDK is downloaded by the third-party server 1212 from the servers 1224 or is otherwise received by the third-party server 1212. Once downloaded or received, the SDK is included as part of the application code of a web-based external resource. The code of the web-based resource can then call or invoke certain functions of the SDK to integrate features of the interaction client 1204 into the web-based resource.

The SDK stored on the server system 1210 effectively provides the bridge between an external resource (e.g., applications 1206 or applets) and the interaction client 1204. This gives the user a seamless experience of communicating with other users on the interaction client 1204 while also preserving the look and feel of the interaction client 1204. To bridge communications between an external resource and an interaction client 1204, the SDK facilitates communication between third-party servers 1212 and the interaction client 1204. A bridge script running on a user system 1202 establishes two one-way communication channels between an external resource and the interaction client 1204. Messages are sent between the external resource and the interaction client 1204 via these communication channels asynchronously. Each SDK function invocation is sent as a message and callback. Each SDK function is implemented by constructing a unique callback identifier and sending a message with that callback identifier.

By using the SDK, not all information from the interaction client 1204 is shared with third-party servers 1212. The SDK limits which information is shared based on the needs of the external resource. Each third-party server 1212 provides an HTML5 file corresponding to the web-based external resource to servers 1224. The servers 1224 can add a visual representation (such as a box art or other graphic) of the web-based external resource in the interaction client 1204. Once the user selects the visual representation or instructs the interaction client 1204 through a GUI of the interaction client 1204 to access features of the web-based external resource, the interaction client 1204 obtains the HTML5 file and instantiates the resources to access the features of the web-based external resource.

The interaction client 1204 presents a graphical user interface (e.g., a landing page or title screen) for an external resource. During, before, or after presenting the landing page or title screen, the interaction client 1204 determines whether the launched external resource has been previously authorized to access user data of the interaction client 1204. In response to determining that the launched external resource has been previously authorized to access user data of the interaction client 1204, the interaction client 1204 presents another graphical user interface of the external resource that includes functions and features of the external resource. In response to determining that the launched external resource has not been previously authorized to access user data of the interaction client 1204, after a threshold period of time (e.g., 3 seconds) of displaying the landing page or title screen of the external resource, the interaction client 1204 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 1204 adds the external resource to a list of authorized external resources and allows the external resource to access user data from the interaction client 1204. The external resource is authorized by the interaction client 1204 to access the user data under an OAuth 2 framework.

The interaction client 1204 controls the type of user data that is shared with external resources based on the type of external resource being authorized. For example, external resources that include full-scale applications (e.g., an application 1206) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 1328 operationally enables the purchasing of advertisements by third parties for presentation to end-users via the interaction clients 1204 and handles the delivery and presentation of these advertisements.

An artificial intelligence and machine learning system 1330 provides a variety of services to different subsystems within the digital interaction system 1200. For example, the artificial intelligence and machine learning system 1330 operates with the image processing system 1302 and the camera system 1304 to analyze images and extract information such as objects, text, or faces. This information can then be used by the image processing system 1302 to enhance, filter, or manipulate images. The artificial intelligence and machine learning system 1330 may be used by the digital effect system 1306 to generate modified content and augmented reality experiences, such as adding virtual objects or animations to real-world images. The communication system 1308 and messaging system 1310 may use the artificial intelligence and machine learning system 1330 to analyze communication patterns and provide insights into how users interact with each other and provide intelligent message classification and tagging, such as categorizing messages based on sentiment or topic. The artificial intelligence and machine learning system 1330 may also provide chatbot functionality to message interactions 1220 between user systems 1202 and between a user system 1202 and the server system 1210. The artificial intelligence and machine learning system 1330 may also work with the audio communication system 1316 to provide speech recognition and natural language processing capabilities, allowing users to interact with the digital interaction system 1200 using voice commands. In some examples, the 1330 provides some or all of the model training and/or model inference functionality of the audio generator 106.

A compliance system 1332 facilitates compliance by the digital interaction system 1200 with data privacy and other regulations, including for example the California Consumer Privacy Act (CCPA), General Data Protection Regulation (GDPR), and Digital Services Act (DSA). The compliance system 1332 comprises several components that address data privacy, protection, and user rights, ensuring a secure environment for user data. A data collection and storage component securely handles user data, using encryption and enforcing data retention policies. A data access and processing component provides controlled access to user data, ensuring compliant data processing and maintaining an audit trail. A data subject rights management component facilitates user rights requests in accordance with privacy regulations, while the data breach detection and response component detects and responds to data breaches in a timely and compliant manner. The compliance system 1332 also incorporates opt-in/opt-out management and privacy controls across the digital interaction system 1200, empowering users to manage their data preferences. The compliance system 1332 is designed to handle sensitive data by obtaining explicit consent, implementing strict access controls and in accordance with applicable laws.

System with Head-Wearable Apparatus

Figure 14:
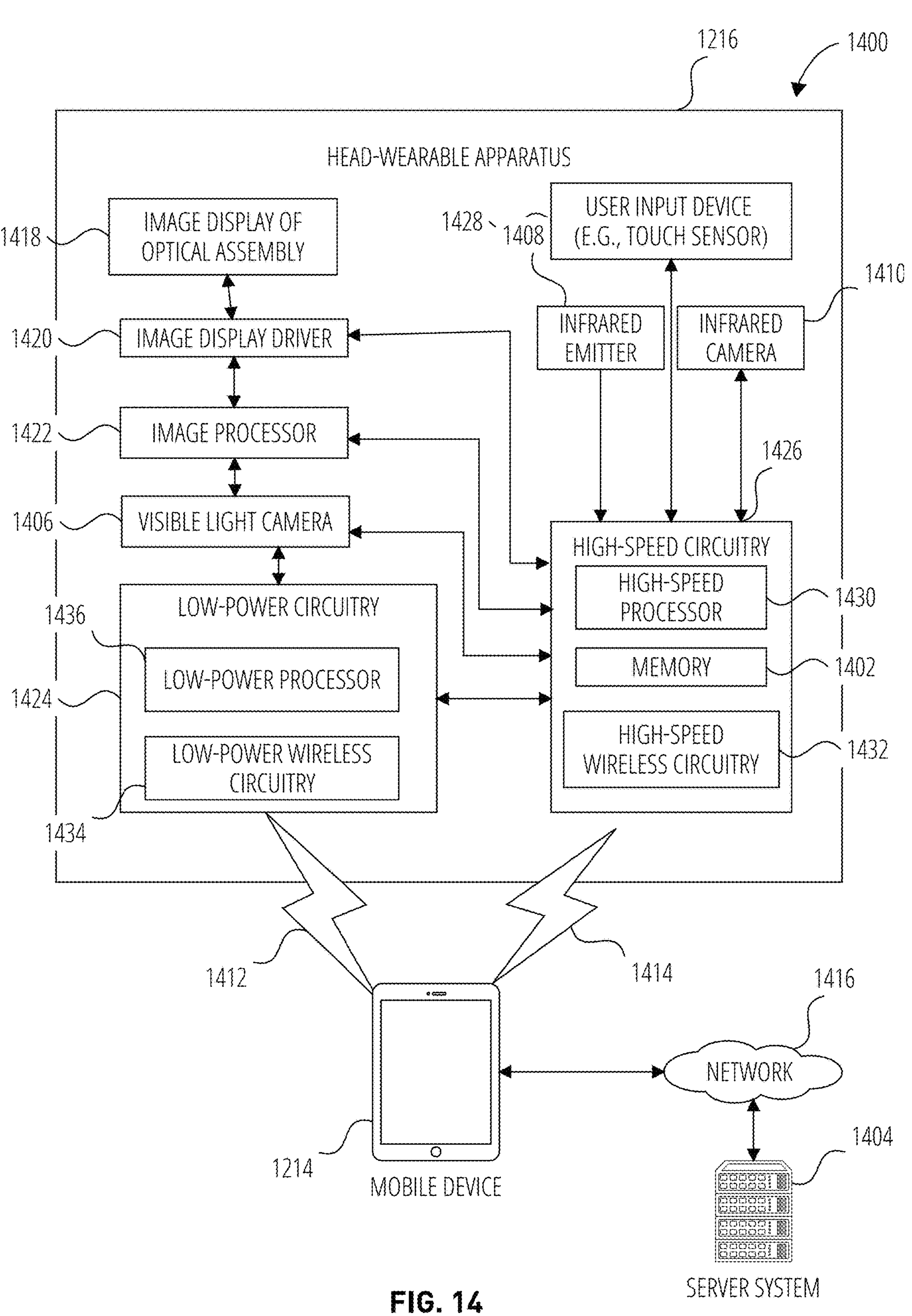
FIG. 14 illustrates a system including a head-wearable apparatus, according to some examples.

FIG. 14 illustrates a system 1400 including a head-wearable apparatus 1216 with a selector input device, according to some examples. FIG. 14 is a high-level functional block diagram of an example head-wearable apparatus 1216 communicatively coupled to a mobile device 1214 and various server systems 1404 (e.g., the server system 1210) via various Networks 1208.

The head-wearable apparatus 1216 includes one or more cameras, each of which may be, for example, a visible light camera 1406, an infrared emitter 1408, and an infrared camera 1410.

The mobile device 1214 connects with head-wearable apparatus 1216 using both a low-power wireless connection 1412 and a high-speed wireless connection 1414. The mobile device 1214 is also connected to the server system 1404 and the Network 1416.

The head-wearable apparatus 1216 further includes two image displays of the image display of optical assembly 1418. The two image displays of optical assembly 1418 include one associated with the left lateral side and one associated with the right lateral side of the head-wearable apparatus 1216. The head-wearable apparatus 1216 also includes an image display driver 1420, an image Processor 1422, low-power circuitry 1424, and high-speed circuitry 1426. The image display of optical assembly 1418 is for presenting images and videos, including an image that can include a graphical user interface to a user of the head-wearable apparatus 1216.

The image display driver 1420 commands and controls the image display of optical assembly 1418. The image display driver 1420 may deliver image data directly to the image display of optical assembly 1418 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 1216 includes a frame and stems (or temples) extending from a lateral side of the frame. The head-wearable apparatus 1216 further includes a user input device 1428 (e.g., touch sensor or push button), including an input surface on the head-wearable apparatus 1216. The user input device 1428 (e.g., touch sensor or push button) is to receive from the user an input selection to manipulate the graphical user interface of the presented image.

The components shown in FIG. 14 for the head-wearable apparatus 1216 are located on one or more circuit boards, for example a PCB or flexible PCB, in the rims or temples. Alternatively, or additionally, the depicted components can be located in the chunks, frames, hinges, or bridge of the head-wearable apparatus 1216. Left and right visible light cameras 1406 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 1216 includes a memory 1402, which stores instructions to perform a subset, or all the functions described herein. The memory 1402 can also include storage device.

As shown in FIG. 14, the high-speed circuitry 1426 includes a high-speed Processor 1430, a memory 1402, and high-speed wireless circuitry 1432. In some examples, the image display driver 1420 is coupled to the high-speed circuitry 1426 and operated by the high-speed Processor 1430 to drive the left and right image displays of the image display of optical assembly 1418. The high-speed Processor 1430 may be any processor capable of managing high-speed communications and operation of any general computing system needed for the head-wearable apparatus 1216. The high-speed Processor 1430 includes processing resources needed for managing high-speed data transfers on a high-speed wireless connection 1414 to a wireless local area network (WLAN) using the high-speed wireless circuitry 1432. In certain examples, the high-speed Processor 1430 executes an operating system such as a LINUX operating system or other such operating system of the head-wearable apparatus 1216, and the operating system is stored in the memory 1402 for execution. In addition to any other responsibilities, the high-speed Processor 1430 executing a software architecture for the head-wearable apparatus 1216 is used to manage data transfers with high-speed wireless circuitry 1432. In certain examples, the high-speed wireless circuitry 1432 is configured to implement Institute of Electrical and Electronic Engineers (IEEE) 802.11 communication standards, also referred to herein as WI-FI®. In some examples, other high-speed communications standards may be implemented by the high-speed wireless circuitry 1432.

The low-power wireless circuitry 1434 and the high-speed wireless circuitry 1432 of the head-wearable apparatus 1216 can include short-range transceivers (e.g., Bluetooth™, Bluetooth LE, Zigbee, ANT+) and wireless wide, local, or wide area Network transceivers (e.g., cellular or WI-FI®). Mobile device 1214, including the transceivers communicating via the low-power wireless connection 1412 and the high-speed wireless connection 1414, may be implemented using details of the architecture of the head-wearable apparatus 1216, as can other elements of the Network 1416.

The memory 1402 includes any storage device capable of storing various data and applications, including, among other things, camera data generated by the left and right visible light cameras 1406, the infrared camera 1410, and the image Processor 1422, as well as images generated for display by the image display driver 1420 on the image displays of the image display of optical assembly 1418. While the memory 1402 is shown as integrated with high-speed circuitry 1426, in some examples, the memory 1402 may be an independent standalone element of the head-wearable apparatus 1216. In certain such examples, electrical routing lines may provide a connection through a chip that includes the high-speed Processor 1430 from the image Processor 1422 or the low-power Processor 1436 to the memory 1402. In some examples, the high-speed Processor 1430 may manage addressing of the memory 1402 such that the low-power Processor 1436 will boot the high-speed Processor 1430 any time that a read or write operation involving memory 1402 is needed.

As shown in FIG. 14, the low-power Processor 1436 or high-speed Processor 1430 of the head-wearable apparatus 1216 can be coupled to the camera (visible light camera 1406, infrared emitter 1408, or infrared camera 1410), the image display driver 1420, the user input device 1428 (e.g., touch sensor or push button), and the memory 1402.

The head-wearable apparatus 1216 is connected to a host computer. For example, the head-wearable apparatus 1216 is paired with the mobile device 1214 via the high-speed wireless connection 1414 or connected to the server system 1404 via the Network 1416. The server system 1404 may be one or more computing devices as part of a service or network computing system, for example, that includes a processor, a memory, and network communication interface to communicate over the Network 1416 with the mobile device 1214 and the head-wearable apparatus 1216.

The mobile device 1214 includes a processor and a Network communication interface coupled to the processor. The Network communication interface allows for communication over the Network 1416, low-power wireless connection 1412, or high-speed wireless connection 1414. Mobile device 1214 can further store at least portions of the instructions in the memory of the mobile device 1214 memory to implement the functionality described herein.

Output components of the head-wearable apparatus 1216 include visual components, such as a display such as a liquid crystal display (LCD), a plasma display panel (PDP), a light-emitting diode (LED) display, a projector, or a waveguide. The image displays of the optical assembly are driven by the image display driver 1420. The output components of the head-wearable apparatus 1216 further include acoustic components (e.g., speakers), haptic components (e.g., a vibratory motor), other signal generators, and so forth. The input components of the head-wearable apparatus 1216, the mobile device 1214, and server system 1404, such as the user input device 1428, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1216 may also include additional peripheral device elements. Such peripheral device elements may include sensors and display elements integrated with the head-wearable apparatus 1216. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1412 and high-speed wireless connection 1414 from the mobile device 1214 via the low-power wireless circuitry 1434 or high-speed wireless circuitry 1432.

Machine Architecture

Figure 15:
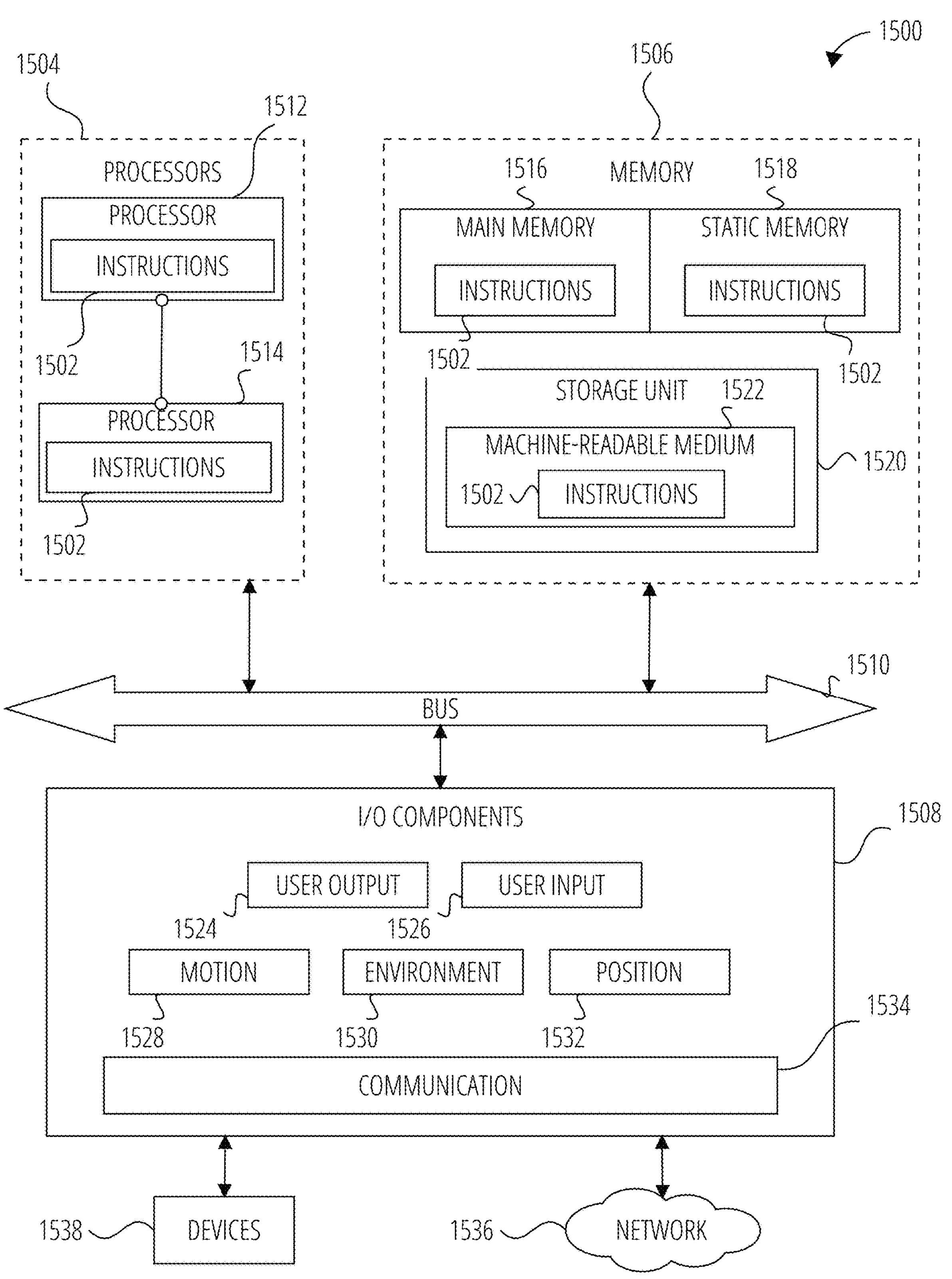
FIG. 15 is a diagrammatic representation of a machine in the form of a computer system within which a set of instructions may be executed to cause the machine to perform any one or more of the methodologies discussed herein, in accordance with some examples.

FIG. 15 is a diagrammatic representation of a machine 1500 within which instructions 1502 (e.g., software, a program, an application, an applet, an app, or other executable code) for causing the machine 1500 to perform any one or more of the methodologies discussed herein may be executed. For example, the instructions 1502 can cause the machine 1500 to implement and control the display system 900 described above. The instructions 1502 transform the general, non-programmed machine 1500 into a particular machine 1500 programmed to carry out the described and illustrated functions in the manner described. The machine 1500 can operate as a standalone device or can be coupled (e.g., networked) to other machines. In a networked deployment, the machine 1500 can operate in the capacity of a server machine or a client machine in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 1502, sequentially or otherwise, that specify actions to be taken by the machine 1500. Further, while a single machine 1500 is illustrated, the term "machine" shall also be taken to include a collection or system of machines that individually or jointly execute the instructions 1502 to perform any one or more of the methodologies discussed herein. In some examples, the machine 1500 can comprise both client and server systems, with certain operations of a particular method or algorithm being performed on the server-side and with certain operations of the particular method or algorithm being performed on the client-side.

The machine 1500 can include processors 1504, memory 1506, and input/output I/O components 1508, which can be configured to communicate with each other via a bus 1510. In an example, the processors 1504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, a processor 1512 and a processor 1514 that execute the instructions 1502. The term "processor" is intended to include multi-core processors that can comprise two or more independent processors (sometimes referred to as "cores") that can execute instructions contemporaneously. Although FIG. 15 shows multiple processors 1504, the machine 1500 can include a single processor with a single-core, a single processor with multiple cores (e.g., a multi-core processor), multiple processors with a single core, multiple processors with multiples cores, or any combination thereof.

The memory 1506 includes a main memory 1516, a static memory 1518, and a storage unit 1520, all accessible to the processors 1504 via the bus 1510. The main memory 1506, the static memory 1518, and the storage unit 1520 store the instructions 1502 embodying any one or more of the methodologies or functions described herein. The instructions 1502 can also reside, completely or partially, within the main memory 1516, within the static memory 1518, within machine-readable medium 1522 within the storage unit 1520, within at least one of the processors 1504 (e.g., within the processor's cache memory), or any suitable combination thereof, during execution thereof by the machine 1500.

The I/O components 1508 can include a wide variety of components to receive input, provide output, produce output, transmit information, exchange information, capture measurements, and so on. The specific I/O components 1508 that are included in a particular machine will depend on the type of machine. For example, portable machines such as mobile phones can include a touch input device or other such input mechanisms, while a headless server machine will likely not include such a touch input device. It will be appreciated that the I/O components 1508 can include many other components that are not shown in FIG. 15. In various examples, the I/O components 1508 can include user output components 1524 and user input components 1526. The user output components 1524 can include or communicate with visual components (e.g., one or more displays such as the left near-eye display and right near-eye display, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1526 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1508 can include motion components 1528, environmental components 1530, or position components 1532, among a wide array of other components.

The motion components 1528 include acceleration sensor components (e.g., accelerometer), gravitation sensor components, rotation sensor components (e.g., gyroscope).

The environmental components 1530 include, for example, one or more externally-facing cameras (with still image/photograph and video capabilities) such as left camera 914 and right camera 916, illumination sensor components (e.g., photometer or ambient light sensor), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that can provide indications, measurements, or signals corresponding to a surrounding physical environment.

Further, the camera system of the machine 1500 can include dual rear cameras (e.g., a primary camera as well as a depth-sensing camera), or even triple, quad or penta rear camera configurations on the front and rear sides of the machine 1500. These multiple cameras systems can include a wide camera, an ultra-wide camera, a telephoto camera, a macro camera, and a depth sensor, for example. In some examples, one or more of the cameras can be used as an ambient light sensor.

The position components 1532 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1508 further include communication components 1534 operable to couple the machine 1500 to a network 1536 or devices 1538 via respective coupling or connections. For example, the communication components 1534 can include a network interface component or another suitable device to interface with the network 1536. In further examples, the communication components 1534 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1538 can be another machine or any of a wide variety of peripheral devices (e.g., a peripheral device coupled via a USB).

Moreover, the communication components 1534 can detect identifiers or include components operable to detect identifiers. For example, the communication components 1534 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information can be derived via the communication components 1534, such as location via Internet Protocol (IP) geolocation, location via Wi-Fi® signal triangulation, location via detecting an NFC beacon signal that can indicate a particular location, and so forth.

The various memories (e.g., main memory 1516, static memory 1518, and memory of the processors 1504) and storage unit 1520 can store one or more sets of instructions and data structures (e.g., software) embodying or used by any one or more of the methodologies or functions described herein. These instructions (e.g., the instructions 1502), when executed by processors 1504, cause various operations to implement the disclosed examples, including the operation of the display system 900.

The instructions 1502 can be transmitted or received over the network 1536, using a transmission medium, via a network interface device (e.g., a network interface component included in the communication components 1534) and using any one of several well-known transfer protocols (e.g., hypertext transfer protocol (HTTP)). Similarly, the instructions 1502 can be transmitted or received using a transmission medium via a coupling (e.g., a peer-to-peer coupling) to the devices 1538.

Software Architecture

Figure 16:
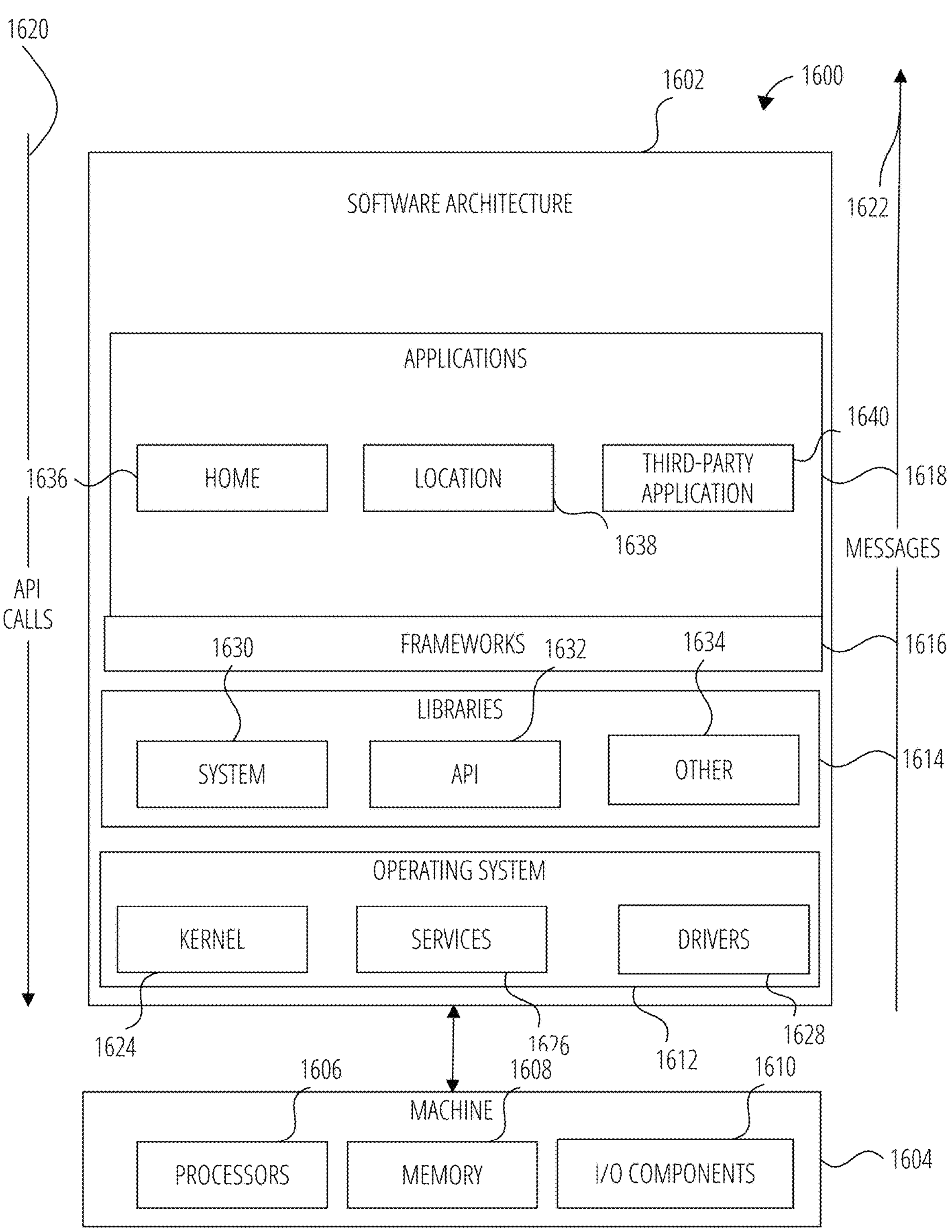
FIG. 16 is a block diagram showing a software architecture within which examples may be implemented, in accordance with some examples.

FIG. 16 is a block diagram 1600 illustrating a software architecture 1602, which can be installed on any one or more of the devices described herein. The software architecture 1602 is supported by hardware such as a machine 1604 that includes processors 1606, memory 1608, and I/O components 1610. In this example, the software architecture 1602 can be conceptualized as a stack of layers, where each layer provides a particular functionality. The software architecture 1602 includes layers such as an operating system 1612, libraries 1614, frameworks 1616, and applications 1618. The applications 1618 can include the audio generator 106, and/or components thereof, as described herein. Operationally, the applications 1618 invoke API calls 1620 through the software stack and receive messages 1622 in response to the API calls 1620. The described examples, and at least some of the functions thereof, can be implemented by components in one or more layers of the software architecture 1602.

The operating system 1612 manages hardware resources and provides common services. The operating system 1612 includes, for example, a kernel 1624, services 1626, and drivers 1628. The kernel 1624 acts as an abstraction layer between the hardware and the other software layers. For example, the kernel 1624 provides memory management, processor management (e.g., scheduling), component management, networking, and security settings, among other functionalities. The services 1626 can provide other common services for the other software layers. The drivers 1628 are responsible for controlling or interfacing with the underlying hardware. For instance, the drivers 1628 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1614 provide a common low-level infrastructure used by the applications 1618. The libraries 1614 can include system libraries 1630 (e.g., C standard library) that provide functions such as memory allocation functions, string manipulation functions, mathematic functions, and the like. In addition, the libraries 1614 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1614 can also include a wide variety of other libraries 1634 to provide many other APIs to the applications 1618.

The frameworks 1616 provide a common high-level infrastructure that is used by the applications 1618. For example, the frameworks 1616 provide various graphical user interface (GUI) functions, high-level resource management, and high-level location services. The frameworks 1616 can provide a broad spectrum of other APIs that can be used by the applications 1618, some of which can be specific to a particular operating system or platform.

In an example, the applications 1618 can include a home application 1636, a location application 1638, and a broad assortment of other applications such as a third-party application 1640. The applications 1618 are programs that execute functions defined in the programs. Various programming languages can be employed to create one or more of the applications 1618, structured in a variety of manners, such as object-oriented programming languages (e.g., Objective-C, Java, or C++) or procedural programming languages (e.g., C or assembly language). In a specific example, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1640 can invoke the API calls 1620 provided by the operating system 1612 to facilitate functionalities described herein.

Figure 17:
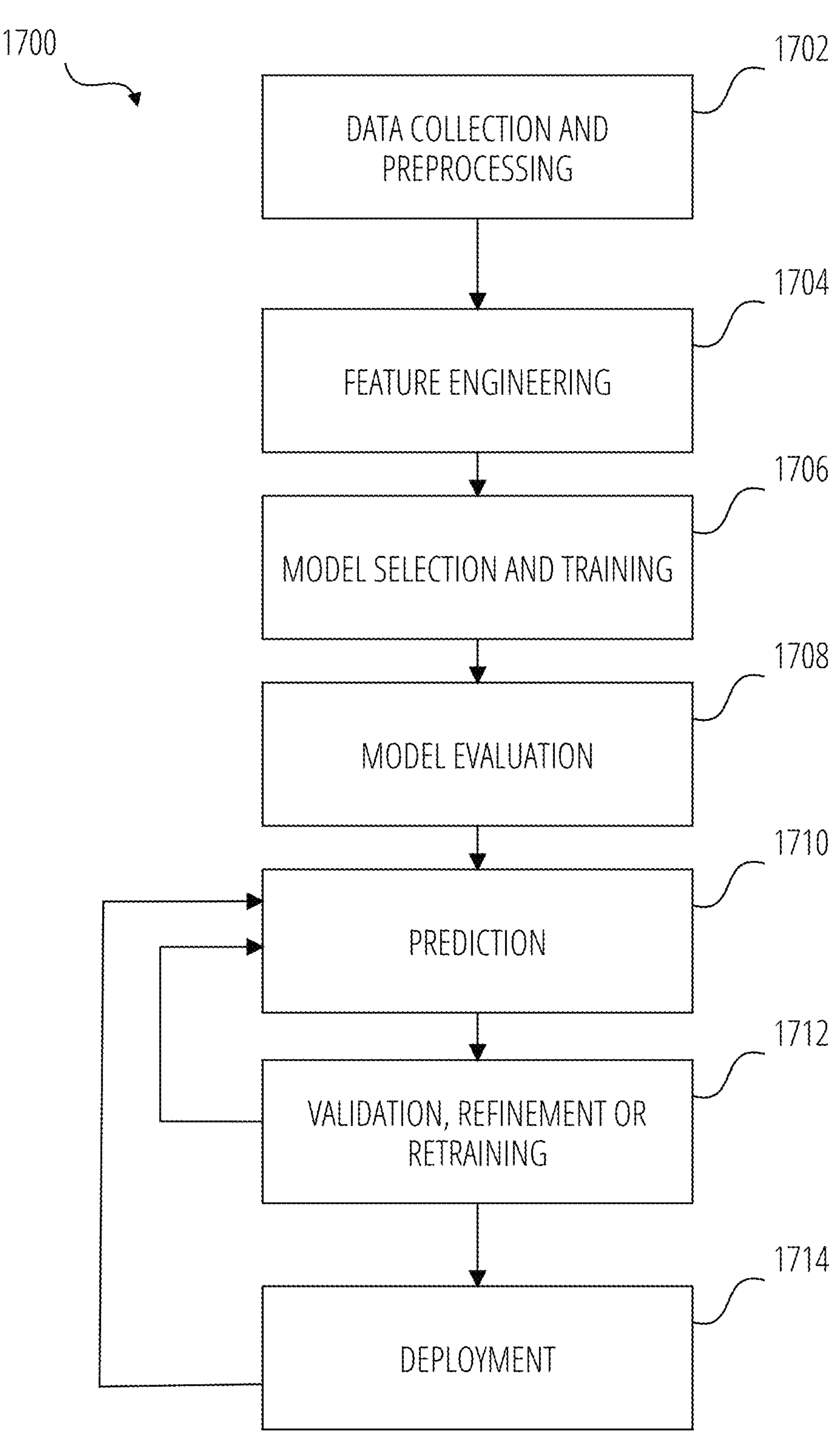
FIG. 17 illustrates a machine-learning pipeline, according to some examples.

FIG. 17 is a flowchart depicting a machine-learning pipeline 1700, according to some examples. The machine-learning pipeline 1700 may be used to generate a trained model, for example the trained machine-learning program 1800 of FIG. 18, to perform operations associated with searches and query responses.

Broadly, machine learning may involve using computer algorithms to automatically learn patterns and relationships in data, potentially without the need for explicit programming. Machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Generating a trained machine-learning program 1800 may include multiple phases that form part of the machine-learning pipeline 1700, including for example the following phases illustrated in FIG. 17:

- Data collection and preprocessing 1702: This phase may include acquiring and cleaning data to ensure that it is suitable for use in the machine learning model. This phase may also include removing duplicates, handling missing values, and converting data into a suitable format.
- Feature engineering 1704: This phase may include selecting and transforming the training data 1804 to create features that are useful for predicting the target variable. Feature engineering may include (1) receiving features 1806 (e.g., as structured or labeled data in supervised learning) and/or (2) identifying features 1806 (e.g., unstructured or unlabeled data for unsupervised learning) in training data 1804 (all shown in FIG. 18).
- Model selection and training 1706: This phase may include selecting an appropriate machine learning algorithm and training it on the preprocessed data. This phase may further involve splitting the data into training and testing sets, using cross-validation to evaluate the model, and tuning hyperparameters to improve performance.
- Model evaluation 1708: This phase may include evaluating the performance of a trained model (e.g., the trained machine-learning program 1800) on a separate testing dataset. This phase can help determine if the model is overfitting or underfitting and determine whether the model is suitable for deployment.
- Prediction 1710: This phase involves using a trained model (e.g., trained machine-learning program 1800) to generate predictions on new, unseen data.
- Validation, refinement or retraining 1712: This phase may include updating a model based on feedback generated from the prediction phase, such as new data or user feedback.
- Deployment 1714: This phase may include integrating the trained model (e.g., the trained machine-learning program 1800) into a more extensive system or application, such as a web service, mobile app, or IoT device. This phase can involve setting up APIs, building a user interface, and ensuring that the model is scalable and can handle large volumes of data.

Figure 18:
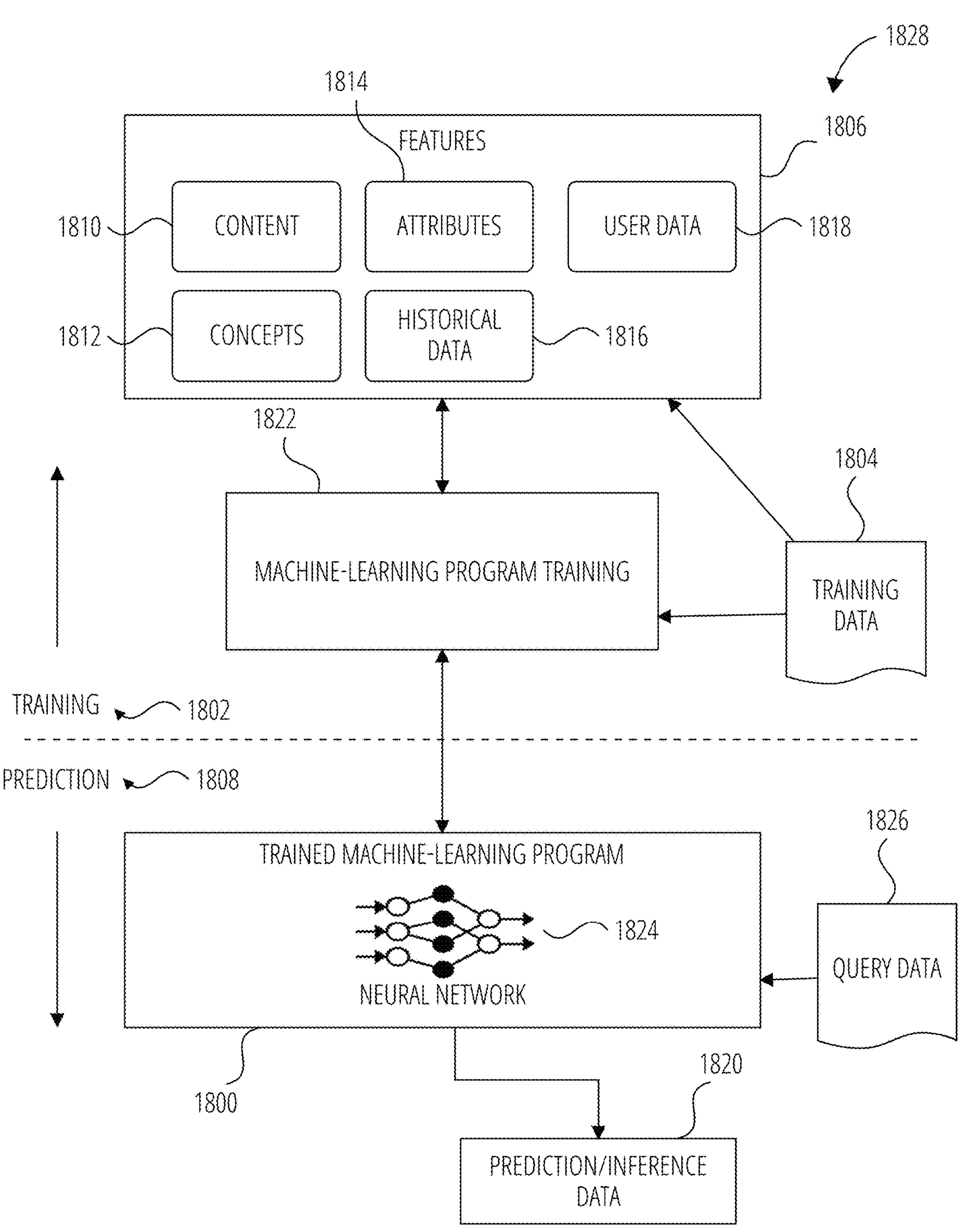
FIG. 18 illustrates training and use of a machine-learning program, according to some examples.

FIG. 18 illustrates further details of two example phases, namely a training phase 1802 (e.g., part of the model selection and trainings 1706) and a prediction phase 1808 (part of prediction 1710). Prior to the training phase 1802, feature engineering is used to identify features 1806. This may include identifying informative, discriminating, and independent features for effectively operating the trained machine-learning program 1800 in pattern recognition, classification, and regression. In some examples, the training data 1804 includes labeled data, known for pre-identified features 1806 and one or more outcomes. Each of the features 1806 may be a variable or attribute, such as an individual measurable property of a process, article, system, or phenomenon represented by a data set (e.g., the training data 1804). Features 1806 may also be of different types, such as numeric features, strings, and graphs, and may include one or more of content 1810, concepts 1812, attributes 1814, historical data 1816, and/or user data 1818, merely for example.

In training phase 1802, the machine-learning pipeline 1828 uses the training data 1804 to find correlations among the features 1806 that affect a predicted outcome or prediction/inference data 1820.

With the training data 1804 and the identified features 1806, the trained machine-learning program 1800 is trained during the training phase 1802 during machine-learning program training 1822. The machine-learning program training 1822 appraises values of the features 1806 as they correlate to the training data 1804. The result of the training is the trained machine-learning program 1800 (e.g., a trained or learned model).

Further, the training phase 1802 may involve machine learning, in which the training data 1804 is structured (e.g., labeled during preprocessing operations). The trained machine-learning program 1800 implements a neural network 1824 capable of performing, for example, classification and clustering operations. In other examples, the training phase 1802 may involve deep learning, in which the training data 1804 is unstructured, and the trained machine-learning program 1800 implements a deep neural network 1824 that can perform both feature extraction and classification/clustering operations.

In some examples, a neural network 1824 may be generated during the training phase 1802, and implemented within the trained machine-learning program 1800. The neural network 1824 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 1824 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 1824 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1802, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 1808, the trained machine-learning program 1800 uses the features 1806 for analyzing query data 1826 to generate inferences, outcomes, or predictions, as examples of a prediction/inference data 1820. For example, during prediction phase 1808, the trained machine-learning program 1800 generates an output. Query data 1826 is provided as an input to the trained machine-learning program 1800, and the trained machine-learning program 1800 generates the prediction/inference data 1820 as output, responsive to receipt of the query data 1826.

In some examples, the trained machine-learning program 1800 may be a generative AI model. Generative AI is a term that may refer to any type of artificial intelligence that can create new content from training data 1804. For example, generative AI can produce text, images, video, audio, code, or synthetic data similar to the original data but not identical. Some of the techniques that may be used in generative AI are:

- Convolutional Neural Networks (CNNs): CNNs may be used for image recognition and computer vision tasks. CNNs may, for example, be designed to extract features from images by using filters or kernels that scan the input image and highlight important patterns.
- Recurrent Neural Networks (RNNs): RNNs may be used for processing sequential data, such as speech, text, and time series data, for example. RNNs employ feedback loops that allow them to capture temporal dependencies and remember past inputs.
- Generative adversarial networks (GANs): GNNs may include two neural networks: a generator and a discriminator. The generator network attempts to create realistic content that can "fool" the discriminator network, while the discriminator network attempts to distinguish between real and fake content. The generator and discriminator networks compete with each other and improve over time.
- Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.
- Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code.

In generative AI examples, the output prediction/inference data 1820 include predictions, translations, summaries or media content.

EXAMPLE STATEMENTS

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and a memory storing instructions that, when executed by the at least one processor, cause the system to perform operations comprising: receiving camera trajectory information; and generating a video using a camera-conditioned video diffusion transformer (DiT) model that performs a denoising process comprising a plurality of denoising passes through a series of pretrained video DiT blocks, the generating of the video comprising: processing video data through a subset of the video DiT blocks of the series to generate video activations, the subset comprising video DiT blocks in an initial portion of the series; processing the camera trajectory information and the video activations through a camera conditioning branch of the camera-conditioned video DiT model to generate camera activations; for a subset of the plurality of denoising passes, the subset comprising an initial portion of the plurality of denoising passes: conditioning the denoising process on the camera activations for the subset of the video DiT blocks; and performing the denoising process for remaining video DiT blocks of the series without conditioning the denoising process on the camera activations; and for a later subset of the plurality of denoising passes: denoising the video using the series of video DiT blocks without conditioning the denoising process on the camera activations.

In Example 2, the subject matter of Example 1, wherein: the initial portion of the series comprises fewer than 30% of the video DiT blocks.

In Example 3, the subject matter of any one or more of Examples 1-2, wherein: the series of pretrained DiT blocks consists of 32 video DiT blocks; and the initial portion of the series consists of a first 8 of the 32 video DiT blocks.

In Example 4, the subject matter of any one or more of Examples 1-3, wherein: the initial portion of the plurality of denoising passes comprises fewer than 50% of the plurality of denoising passes.

In Example 5, the subject matter of any one or more of Examples 1-4, wherein: the initial portion of the plurality of denoising passes comprises fewer than 25% of the plurality of denoising passes.

In Example 6, the subject matter of any one or more of Examples 1-5, wherein: the camera conditioning branch comprises: a camera preprocessor to generate a camera encoding based on the camera trajectory information and temporally aligned with the video; and a series of camera DiT blocks trained to generate the camera activations based on the camera encoding and the video activations.

In Example 7, the subject matter of Example 6, wherein: the series of camera DiT blocks comprises, for each video DiT block in the initial portion of the series of video DiT blocks, a corresponding camera DiT block; and the conditioning of the denoising process on the camera activations for the subset of the video DiT blocks comprises: generating first video data at a first video DiT block of the initial portion of the series; generating first camera activations at a first camera DiT block of the series of camera DiT blocks based on the first video data and the camera encoding; for each additional camera DiT block in the series of camera DiT blocks: generating additional camera activations based on: camera activations generated by a prior camera DiT block in the series; and video data generated by the corresponding video DiT block; and for each additional video DiT block of the first portion of the series, and for a first video DiT block of the remaining video DiT blocks: generating additional video data based on the camera activations generated by a camera DiT block corresponding to a prior video DiT block of the series.

In Example 8, the subject matter of any one or more of Examples 6-7, wherein: the video data comprises video tokens corresponding to spatial regions of video frames; and the camera preprocessor comprises: a transformation block to transform the camera trajectory information into a spatial representation; a camera encoding block to encode the spatial representation to match temporal characteristics of the video data to generate a spatial-temporal representation; and a patchify block to project the spatial-temporal representation to match dimensions of the video tokens, thereby generating the camera encoding.

In Example 9, the subject matter of Example 8, wherein the operations further comprise: performing supervised learning to train the camera-conditioned video DiT model; maintaining parameter values of the video DiT blocks during the supervised learning; and adjusting learnable parameters of the camera DiT blocks and the camera encoding block during the supervised learning.

In Example 10, the subject matter of Example 9, wherein: the camera conditioning branch further comprises one or more fully-connected layers; and learnable parameters of the one or more fully-connected layers are adjusted during the supervised learning.

In Example 11, the subject matter of any one or more of Examples 9-10, wherein: the supervised learning is performed using a training dataset comprising: videos having a static camera showing action in a scene; and videos having a moving camera and a static scene.

In Example 12, the subject matter of any one or more of Examples 1-11, wherein: the camera-conditioned video DiT model further conditions the denoising process on a text input.

In Example 13, the subject matter of any one or more of Examples 1-12, wherein: the camera-conditioned video DiT model generates the video based on a video input.

In Example 14, the subject matter of Example 13, wherein: the camera-conditioned video DiT model comprises a video preprocessor to: encode the video input; segment the encoded video input to generate video tokens corresponding to spatial regions of video frames of the video input; and provide the video tokens as inputs to a first video DiT block of the initial portion of the series.

In Example 15, the subject matter of any one or more of Examples 1-14, wherein: the camera-conditioned video DiT model comprises a video postprocessor to decode video activations generated by a final video DiT block of the series to generate the video.

In Example 16, the subject matter of any one or more of Examples 1-15, wherein a method comprises: receiving camera trajectory information; and generating a video using a camera-conditioned video diffusion transformer (DiT) model that performs a denoising process comprising a plurality of denoising passes through a series of pretrained video DiT blocks, the generating of the video comprising: processing video data through a subset of the video DiT blocks of the series to generate video activations, the subset comprising video DiT blocks in an initial portion of the series; processing the camera trajectory information and the video activations through a camera conditioning branch of the camera-conditioned video DiT model to generate camera activations; for a subset of the plurality of denoising passes, the subset comprising an initial portion of the plurality of denoising passes: conditioning the denoising process on the camera activations for the subset of the video DiT blocks; and performing the denoising process for remaining video DiT blocks of the series without conditioning the denoising process on the camera activations; and for a later subset of the plurality of denoising passes: denoising the video using the series of video DiT blocks without conditioning the denoising process on the camera activations.

In Example 17, the subject matter of Example 16, wherein: the initial portion of the series comprises fewer than 30% of the video DiT blocks.

In Example 18, the subject matter of any one or more of Examples 16-17, wherein: the initial portion of the plurality of denoising passes comprises fewer than 50% of the plurality of denoising passes.

In Example 19, the subject matter of Example 18, wherein: the initial portion of the plurality of denoising passes comprises fewer than 25% of the plurality of denoising passes.

In Example 20, the subject matter of any one or more of Examples 1-19, wherein the non-transitory computer-readable storage medium includes instructions that, when executed by at least one processor of a system, cause the system to perform operations comprising: receiving camera trajectory information; and generating a video using a camera-conditioned video diffusion transformer (DiT) model that performs a denoising process comprising a plurality of denoising passes through a series of pretrained video DiT blocks, the generating of the video comprising: processing video data through a subset of the video DiT blocks of the series to generate video activations, the subset comprising video DiT blocks in an initial portion of the series; processing the camera trajectory information and the video activations through a camera conditioning branch of the camera-conditioned video DiT model to generate camera activations; for a subset of the plurality of denoising passes, the subset comprising an initial portion of the plurality of denoising passes: conditioning the denoising process on the camera activations for the subset of the video DiT blocks; and performing the denoising process for remaining video DiT blocks of the series without conditioning the denoising process on the camera activations; and for a later subset of the plurality of denoising passes: denoising the video using the series of video DiT blocks without conditioning the denoising process on the camera activations.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Other technical features may be readily apparent to one skilled in the art from the figures, descriptions, and claims herein.

TERM EXAMPLES

"2D" refers to, for example, a two-dimensional space, object, or representation, such as an image or a surface.

"3D" refers to, for example, a three-dimensional space, object, or representation, such as a three-dimensional volumetric model or a representation of a scene. "Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Extended reality" (XR) refers, for example, to an interactive experience of a real-world environment where physical objects that reside in the real-world are "augmented" or enhanced by computer-generated digital content (also referred to as virtual content or synthetic content). XR can also refer to a system that enables a combination of real and virtual worlds, real-time interaction, and 3D registration of virtual and real objects. A user of an XR system perceives virtual content that appears to be attached to, or interacts with, a real-world physical object. XR includes augmented reality (AR) and virtual reality (VR).

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Network" may include, for example, one or more portions of a network that may be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VOIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable storage medium" refers, for example, to a tangible medium that is capable of storing, encoding, or carrying the instructions for execution by a machine.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

CONCLUSION

Described examples of camera-conditioned video diffusion transformer (DiT) models seek to provide technical solutions to one or more example technical problems, such as the following.

First, current text-to-video generation models lack precise camera control capabilities. While these models can create realistic videos from text descriptions, they may struggle to accurately follow camera movement instructions provided in text prompts, potentially resulting in unpredictable camera behavior. The described technology attempts to address this by implementing a specialized camera conditioning branch that works alongside the main video generation process. In some examples, this branch processes camera trajectory information through a transformation block that converts it into Plücker coordinates, a temporal encoding block that aligns it with the video's temporal characteristics, and a patchify block that projects the camera data to match the dimensions of video tokens. The camera conditioning branch then feeds this processed information into the video diffusion model during the denoising process using camera DiT blocks interleaved with the video DiT blocks, enabling precise control over camera movements while maintaining high visual quality.

Second, existing camera control methods in video generation models tend to degrade visual quality and scene motion. When attempting to add camera control capabilities to video models, the resulting videos may suffer from reduced visual fidelity and diminished scene dynamics. The described technology attempts to solve this through a strategic approach to camera conditioning based on spectral analysis of camera motion. By determining that camera motion is primarily a low-frequency signal established early in the denoising process (approximately the first 10-20% of denoising passes), the system applies camera conditioning only during these initial passes. This can be implemented, e.g., through operations 708 and 710 in method 700, where camera activations condition the denoising process during initial passes but not during later passes. This approach can potentially improves visual quality by approximately 15% and/or camera control accuracy by approximately 30% compared to conditioning throughout the entire denoising process.

Third, camera control methods often require excessive computational resources and training parameters. Adding camera control capabilities to video models typically involves significant computational overhead. The described technology attempts to address this through targeted layer-specific camera conditioning. By analyzing the internal representations of video DiT models through linear probing, it was determined that camera information is primarily processed in the early layers of the video model (such as the first 8 out of 32 layers). This insight is leveraged in the described examples by limiting camera conditioning to only these early layers, reducing the number of trainable parameters (e.g., by approximately a factor of 4), improving training speed (e.g., by approximately 15%), and enhancing visual quality (e.g., by approximately 10%). This can be implemented in the architecture shown in FIG. 3, where only the initial portion 310 of the series of V-DiT blocks 302 receives camera conditioning.

Fourth, available training datasets for camera control are heavily biased toward static scenes. Datasets like RealEstate10K contain diverse camera trajectories but mostly static scenes, causing models trained on such data to suppress scene dynamics when camera conditioning is applied. The described technology mitigates this through a balanced training dataset approach. By complementing RealEstate10K with a curated dataset of 20,000 in-the-wild dynamic videos with stationary cameras, the model can be trained to disambiguate between camera movement and scene movement. This can be implemented in method 800, where the balanced training dataset is obtained at operation 802. This approach can improve visual quality on out-of-distribution prompts (e.g., by approximately 17%) while maintaining precise camera control.

Fifth, camera trajectory information in training datasets often has arbitrary and inconsistent scaling. This makes it difficult for models to learn consistent camera control. The described technology can address this by implementing a metric scaling procedure that uses a pre-trained zero-shot metric depth estimator to rescale camera trajectories across all training data to a consistent reference scale. This approach can potentially improve camera control predictability without degrading visual quality, making the camera control more intuitive for users by allowing them to control the magnitudes of camera transitions more precisely.

Other technical problems may be addressed by various examples described herein, as will be appreciated by a skilled person.

What is claimed is:

1. A system comprising:

at least one processor; and a memory storing instructions that, when executed by the at least one processor, cause the system to perform operations comprising:

receiving camera trajectory information; and generating a video using a camera-conditioned video diffusion transformer (DiT) model that performs a denoising process comprising a plurality of denoising passes by a series of pretrained video DiT blocks, the generating of the video comprising:

processing video data through a subset of the video DiT blocks of the series to generate video activations, the subset comprising video DiT blocks in an initial portion of the series;

processing the camera trajectory information and the video activations through a camera conditioning branch of the camera-conditioned video DiT model to generate camera activations;

for a subset of the plurality of denoising passes, the subset comprising an initial portion of the plurality of denoising passes:

conditioning the denoising process on the camera activations for the subset of the video DiT blocks; and performing the denoising process for remaining video DiT blocks of the series without conditioning the denoising process on the camera activations; and for a later subset of the plurality of denoising passes:

denoising the video using the series of video DiT blocks without conditioning the denoising process on the camera activations.

2. The system of claim 1, wherein:

the initial portion of the series comprises fewer than 30% of the video DiT blocks.

3. The system of claim 2, wherein:

the series of pretrained DiT blocks consists of 32 video DiT blocks; and the initial portion of the series consists of a first 8 of the 32 video DiT blocks.

4. The system of claim 1, wherein:

the initial portion of the plurality of denoising passes comprises fewer than 50% of the plurality of denoising passes.

5. The system of claim 4, wherein:

the initial portion of the plurality of denoising passes comprises fewer than 25% of the plurality of denoising passes.

6. The system of claim 1, wherein:

the camera conditioning branch comprises:

a camera preprocessor to generate a camera encoding based on the camera trajectory information and temporally aligned with the video; and a series of camera DiT blocks trained to generate the camera activations based on the camera encoding and the video activations.

7. The system of claim 6, wherein:

the series of camera DiT blocks comprises, for each video DiT block in the initial portion of the series of video DiT blocks, a corresponding camera DiT block; and the conditioning of the denoising process on the camera activations for the subset of the video DiT blocks comprises:

generating first video data at a first video DiT block of the initial portion of the series;

generating first camera activations at a first camera DiT block of the series of camera DiT blocks based on the first video data and the camera encoding;

for each additional camera DiT block in the series of camera DiT blocks:

generating additional camera activations based on:

camera activations generated by a prior camera DiT block in the series; and video data generated by the corresponding video DiT block; and for each additional video DiT block of the first portion of the series, and for a first video DiT block of the remaining video DiT blocks:

generating additional video data based on the camera activations generated by a camera DiT block corresponding to a prior video DiT block of the series.

8. The system of claim 6, wherein:

the video data comprises video tokens corresponding to spatial regions of video frames; and the camera preprocessor comprises:

a transformation block to transform the camera trajectory information into a spatial representation;

a camera encoding block to encode the spatial representation to match temporal characteristics of the video data to generate a spatial-temporal representation; and a patchify block to project the spatial-temporal representation to match dimensions of the video tokens, thereby generating the camera encoding.

9. The system of claim 8, wherein the operations further comprise:

performing supervised learning to train the camera-conditioned video DiT model;

maintaining parameter values of the video DiT blocks during the supervised learning; and adjusting learnable parameters of the camera DiT blocks and the camera encoding block during the supervised learning.

10. The system of claim 9, wherein:

the camera conditioning branch further comprises one or more fully-connected layers; and learnable parameters of the one or more fully-connected layers are adjusted during the supervised learning.

11. The system of claim 9, wherein:

the supervised learning is performed using a training dataset comprising:

videos having a static camera showing action in a scene; and videos having a moving camera and a static scene.

12. The system of claim 1, wherein:

the camera-conditioned video DiT model further conditions the denoising process on a text input.

13. The system of claim 1, wherein:

the camera-conditioned video DiT model generates the video based on a video input.

14. The system of claim 13, wherein:

the camera-conditioned video DiT model comprises a video preprocessor to:

encode the video input;

segment the encoded video input to generate video tokens corresponding to spatial regions of video frames of the video input; and provide the video tokens as inputs to a first video DiT block of the initial portion of the series.

15. The system of claim 1, wherein:

the camera-conditioned video DiT model comprises a video postprocessor to decode video activations generated by a final video DiT block of the series to generate the video.

16. A method for generating a camera-conditioned video, the method comprising:

receiving camera trajectory information; and generating a video using a camera-conditioned video diffusion transformer (DiT) model that performs a denoising process comprising a plurality of denoising passes through a series of pretrained video DiT blocks, the generating of the video comprising:

processing video data through a subset of the video DiT blocks of the series to generate video activations, the subset comprising video DiT blocks in an initial portion of the series;

processing the camera trajectory information and the video activations through a camera conditioning branch of the camera-conditioned video DiT model to generate camera activations;

for a subset of the plurality of denoising passes, the subset comprising an initial portion of the plurality of denoising passes:

conditioning the denoising process on the camera activations for the subset of the video DiT blocks; and performing the denoising process for remaining video DiT blocks of the series without conditioning the denoising process on the camera activations; and for a later subset of the plurality of denoising passes:

denoising the video using the series of video DiT blocks without conditioning the denoising process on the camera activations.

17. The method of claim 16, wherein:

the initial portion of the series comprises fewer than 30% of the video DiT blocks.

18. The method of claim 16, wherein:

the initial portion of the plurality of denoising passes comprises fewer than 50% of the plurality of denoising passes.

19. The method of claim 18, wherein:

the initial portion of the plurality of denoising passes comprises fewer than 25% of the plurality of denoising passes.

20. A non-transitory computer-readable storage medium, the computer-readable storage medium including instructions that, when executed by at least one processor of a system, cause the system to perform operations comprising:

receiving camera trajectory information; and generating a video using a camera-conditioned video diffusion transformer (DiT) model that performs a denoising process comprising a plurality of denoising passes through a series of pretrained video DiT blocks, the generating of the video comprising:

processing video data through a subset of the video DiT blocks of the series to generate video activations, the subset comprising video DiT blocks in an initial portion of the series;

processing the camera trajectory information and the video activations through a camera conditioning branch of the camera-conditioned video DiT model to generate camera activations;

for a subset of the plurality of denoising passes, the subset comprising an initial portion of the plurality of denoising passes:

conditioning the denoising process on the camera activations for the subset of the video DiT blocks; and performing the denoising process for remaining video DiT blocks of the series without conditioning the denoising process on the camera activations; and for a later subset of the plurality of denoising passes:

denoising the video using the series of video DiT blocks without conditioning the denoising process on the camera activations.

* * * * *